(12) United States Patent
Miyawaki et al.

(10) Patent No.: US 7,236,298 B2
(45) Date of Patent: *Jun. 26, 2007

(54) ILLUMINATION APPARATUS FOR MICROSCOPE AND IMAGE PROCESSING APPARATUS USING THE SAME

(75) Inventors: Atsushi Miyawaki, Wako (JP); Takashi Fukano, Tokyo-to (JP); Yasushi Aono, Yokohama (JP)

(73) Assignees: The Institute of Physical & Chemical Research, Wako-shi (JP); Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,150

(22) Filed: Sep. 13, 2006

(65) Prior Publication Data

US 2007/0008615 A1    Jan. 11, 2007

Related U.S. Application Data

(62) Division of application No. 10/718,884, filed on Nov. 20, 2003, now Pat. No. 7,126,752.

(30) Foreign Application Priority Data

Nov. 27, 2002   (JP)   ............................. 2002-343807

(51) Int. Cl.
    *G02B 21/06* (2006.01)
(52) U.S. Cl. ..................... 359/385; 359/363; 359/386
(58) Field of Classification Search ............... 359/368, 359/363, 385, 381
    See application file for complete search history.

(56) References Cited

U.S. PATENT DOCUMENTS

| | | | |
|---|---|---|---|
| 5,812,223 A | 9/1998 | Noguchi | |
| 5,835,262 A | 11/1998 | Iketaki et al. | |
| 6,278,555 B1 | 8/2001 | Stock et al. | |
| 6,826,424 B1 | 11/2004 | Zeng et al. | |
| 6,898,458 B2 | 5/2005 | Zeng et al. | |
| 7,126,752 B2* | 10/2006 | Miyawaki et al. | 359/385 |

FOREIGN PATENT DOCUMENTS

| | | |
|---|---|---|
| DE | 101 23 439 A1 | 11/2002 |
| JP | 07-056092 A | 3/1995 |
| JP | 09-005243 A | 1/1997 |
| JP | 10-090608 A | 4/1998 |

* cited by examiner

*Primary Examiner*—Mark A. Robinson
(74) *Attorney, Agent, or Firm*—Frishauf, Holtz, Goodman & Chick, P.C.

(57) ABSTRACT

An illumination apparatus for a microscope and an image processing apparatus using the illumination apparatus include a light source, a semi-transmissive mirror splitting a light beam from the light source into two beams of the first and second irradiation light, two excitation filters selecting the wavelengths of the first and second irradiation light, a semi-transmissive mirror synthesizing individual beams of the first and second irradiation light whose wavelengths are selected, into a single beam, a dichroic mirror directing a light beam synthesized by the semi-transmissive mirror toward a specimen and transmitting light from the specimen, an objective lens, cameras imaging fluorescent light from the specimen after being separated into fluorescent light excited by the first and second wavelengths, and an image processing section processing fluorescent images formed by imaging elements.

15 Claims, 13 Drawing Sheets

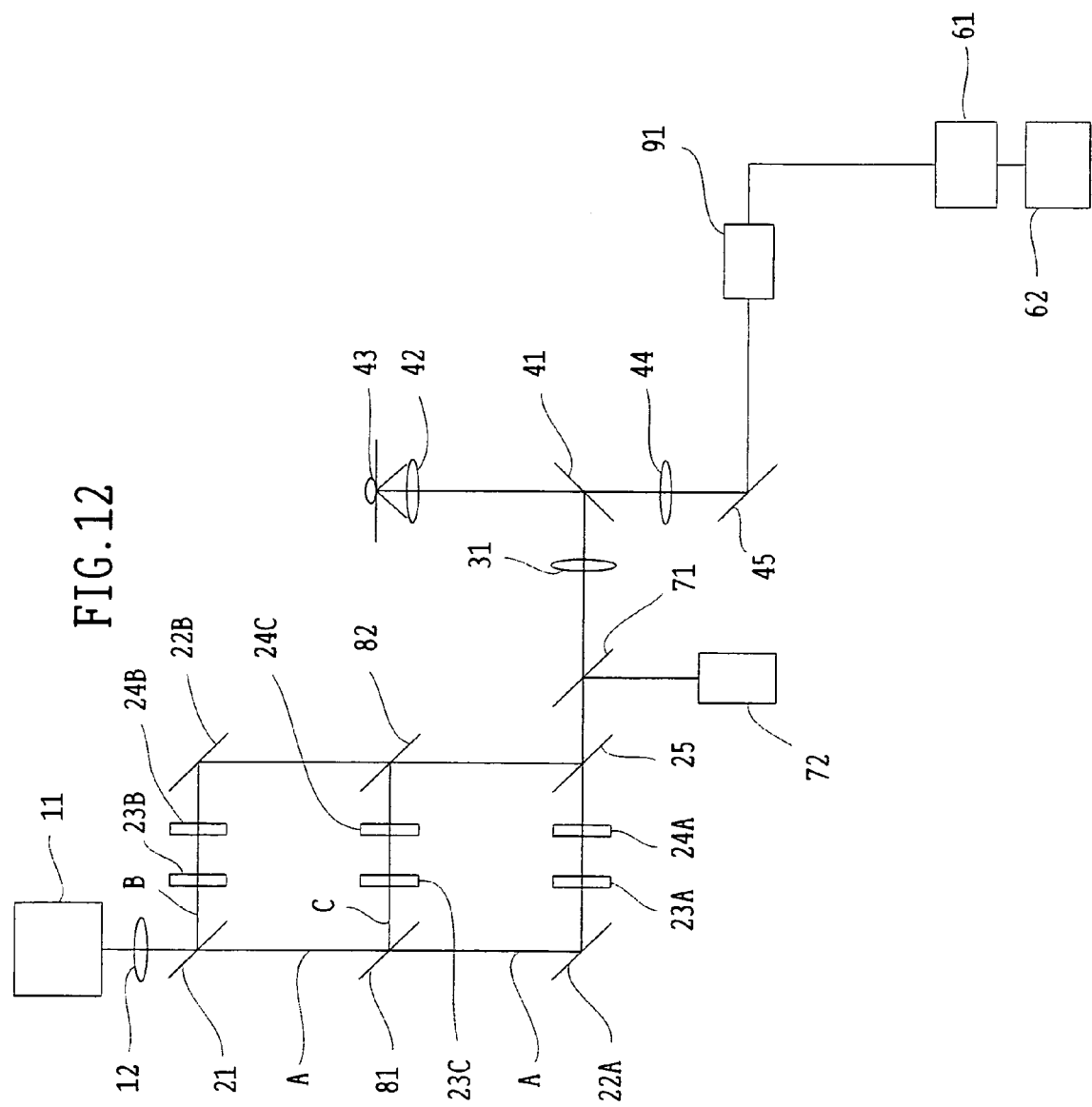

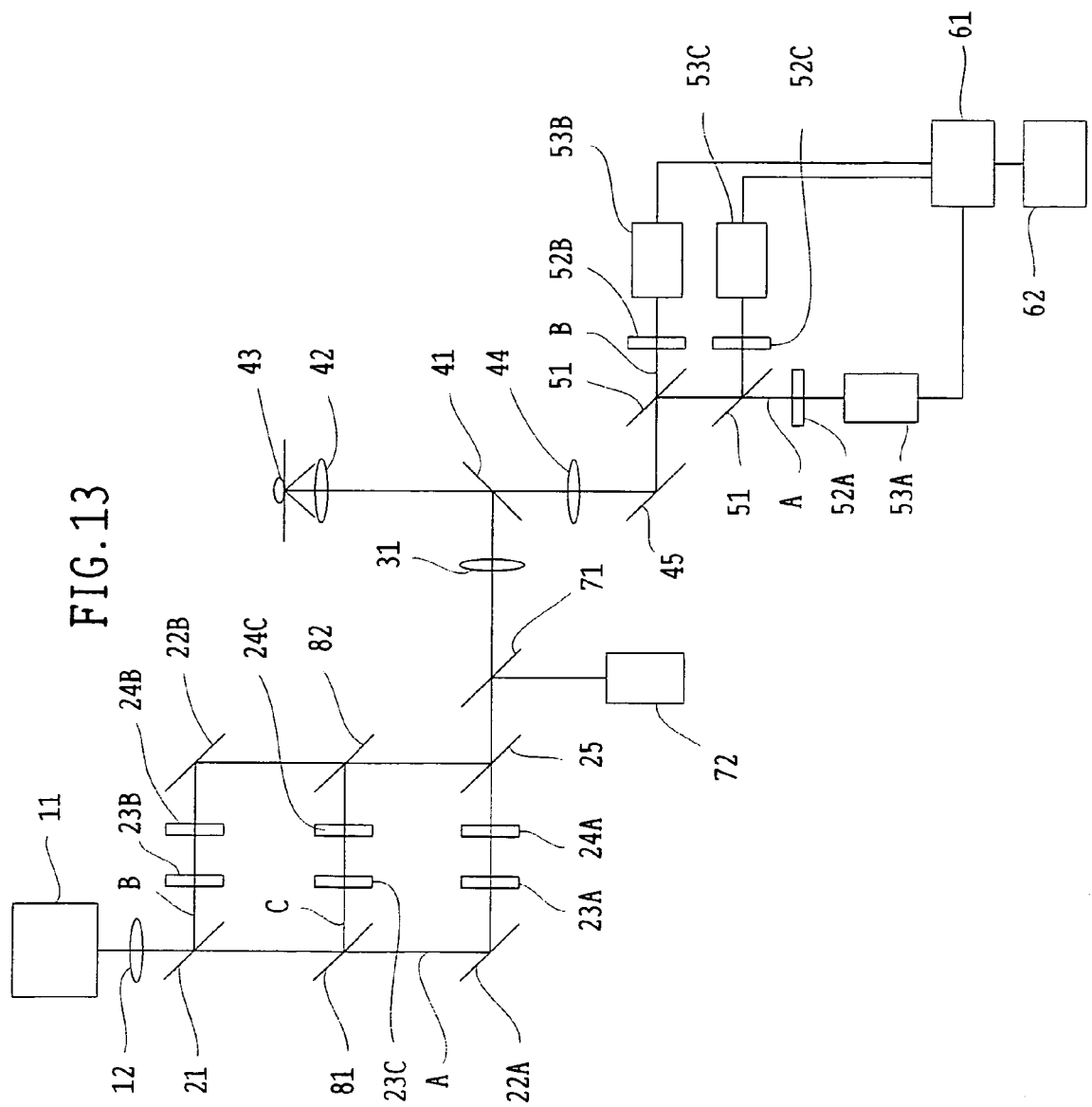

ILLUMINATION APPARATUS FOR MICROSCOPE AND IMAGE PROCESSING APPARATUS USING THE SAME

This application is a Divisional application of Ser. No. 10/718,884, now U.S. Pat. No. 7,126,752, filed Nov. 20, 2003, the entire contents of which are incorporated herein by reference.

BACKGROUND OF THE INVENTION

1. Field of the Invention

This invention relates to an illumination apparatus for a microscope in which a plurality of wavelengths of light can be arbitrarily chosen, their intensities can be independently adjusted, and a specimen can be irradiated with the light at the same time, and to an image processing apparatus using this illumination apparatus.

2. Description of Related Art

Generally, fluorescence microscopes are widely used for the purpose of detecting proteins and genes in which fluorescence labeling is applied to living tissues and cells in the fields of medicine, biology, and others. In recent years, a multiple fluorescence detection technique that a specimen stained with a plurality of fluorescent dyes or a specimen revealing a plurality of fluorescence proteins is observed at a time has particularly exercised its power for the analysis of genes and the solution of intracellular structures. In the multiple fluorescence detection technique, in order to excite a multiple fluorescence specimen, a means for irradiating the specimen with illumination light of a plurality of wavelengths has widespread use. Here, important factors governing the accuracy of observation data are that time intervals of irradiation with individual wavelengths are short and the intensity distribution of irradiation light of each wavelength on the surface of the specimen remains unchanged in terms of time and space.

As conventional means for irradiating the specimen with the illumination light of the plurality of wavelengths in order to excite the multiple fluorescence specimen, an apparatus using a filter switching means to time-divide the wavelengths of excitation light (see, for example, Japanese Pat. Kokai No. Hei 09-005243) and an apparatus using two independent light sources (see, for example, Japanese Patent Kokai No. Hei 07-056092) are proposed. In addition, an apparatus dividing light from a single light source to irradiate a specimen with divided light (see, for example, Japanese Patent Kokai No. Hei 10-090608) is proposed.

The apparatus disclosed in Kokai No. Hei 09-005243, as shown in FIG. 1, is constructed so that a living tissue to be measured is previously processed with fluorescent light of a plurality of wavelengths; a filter switching means 151 in which a plurality of filters 151a for excitation light selection are set at a predetermined place in a rotary disk 151b and a filter switching means 152 in which a plurality of filters 152a for fluorescent light selection are set at a predetermined place in a rotary disk 152b are used; by synchronously rotating these disks, the living tissue is irradiated with the first excitation light and the second excitation light by time division; the first fluorescent light and the second fluorescent light, produced from the living tissue, are recorded in turn; and, for example, changes in intracellular ion concentration and in membrane potential are measured at substantially the same time.

The apparatus set forth in Kokai No. Hei 07-056092, as shown in FIG. 2, is constructed so that two light sources 161A and 161B for white light, such as xenon lamps, are used; light from the lamps, after being collected through collector lenses 162A and 162B, is transmitted through excitation filters 163A and 163B which have different transmission wavelength regions, and wavelengths are selected; and light of selected wavelengths is synthesized by a dichroic mirror 164 and is introduced into an observation optical system 165. According to this apparatus, a specimen can be illuminated with light of desired wavelengths by properly replacing the excitation filters 163A and 163B.

The apparatus set forth in Kokai No. Hei 10-090608, as shown in FIG. 3, is constructed so that irradiation light emitted from a light source 171 for irradiation is split through a splitting optical system 172 and different parts on a specimen 173 are irradiated with split light beams A and B.

SUMMARY OF THE INVENTION

The illumination apparatus for the microscope according to the present invention includes a light source for white light; a beam splitting means splitting a light beam emitted from the light source into a plurality of beams of irradiation light; wavelength-selective means provided on optical paths of illumination light split by the beam splitting means to select wavelengths of the illumination light; and a beam synthesizing mean synthesizing the plurality of beams of irradiation light whose wavelengths are selected, into a single light beam.

The illumination apparatus for the microscope according to the present invention includes a light source for white light; a beam splitting means splitting a light beam emitted from the light source into beams of first irradiation light and second irradiation light; a first wavelength-selective means selecting the wavelength of the first irradiation light; a second wavelength-selective means selecting the wavelength of the second irradiation light; and a beam synthesizing means synthesizing the beam of the first irradiation light whose wavelength is selected and the beam of the second irradiation light whose wavelength is selected, into a single light beam.

The illumination apparatus for the microscope according to the present invention and the image processing apparatus using the illumination apparatus include a light source for white light; a beam splitting means splitting a light beam emitted from the light source into a plurality of beams of irradiation light; wavelength-selective means provided on optical paths of illumination light split by the beam splitting means to select wavelengths of the illumination light; a beam synthesizing mean synthesizing the plurality of beams of irradiation light whose wavelengths are selected, into a single light beam; a mirror introducing the light beam synthesized by the beam synthesizing means in a direction in which a specimen is irradiated and transmitting light from the specimen; an objective lens interposed between the mirror and the specimen; imaging elements imaging fluorescent light from the specimen passing through the objective lens and the mirror, after being separated into fluorescent light excited by individual wavelengths; and an image processing means processing fluorescent images formed by the imaging elements.

The illumination apparatus for the microscope according to the present invention and the image processing apparatus using the illumination apparatus include a light source for white light; a beam splitting means splitting a light beam emitted from the light source into two beams of first irradiation light and second irradiation light; a first wavelength-selective means selecting the wavelength of the first irradiation light; a second wavelength-selective means selecting the wavelength of the second irradiation light; a beam synthesizing means synthesizing the beam of the first irradiation light whose wavelength is selected and the beam of the second irradiation light whose wavelength is selected, into a single light beam; a mirror introducing the light beam synthesized by the beam synthesizing means in a direction in which a specimen is irradiated and transmitting light from the specimen; an objective lens interposed between the mirror and the specimen; imaging elements imaging fluorescent light from the specimen passing through the objective lens and the mirror, after being separated into fluorescent light excited by a first wavelength and fluorescent light excited by a second wavelength; and an image processing means processing fluorescent images formed by the imaging elements.

The illumination apparatus for the microscope according to the present invention and the image processing apparatus using the illumination apparatus include a light source for white light; a beam splitting means splitting a light beam emitted from the light source into a plurality of beams of irradiation light; wavelength-selective means provided on optical paths of illumination light split by the beam splitting means to select wavelengths of the illumination light; a beam synthesizing mean synthesizing the plurality of beams of irradiation light whose wavelengths are selected, into a single light beam; a first objective lens introducing the light beam synthesized by the beam synthesizing means in a direction in which a specimen is irradiated; a second objective lens placed opposite to the first objective lens, with the specimen between them; imaging elements imaging fluorescent light from the specimen passing through the second objective lens, after being separated into fluorescent light excited by individual wavelengths; and an image processing means processing fluorescent images formed by the imaging elements.

The illumination apparatus for the microscope according to the present invention and the image processing apparatus using the illumination apparatus include a light source for white light; a beam splitting means splitting a light beam emitted from the light source into beams of first irradiation light and second irradiation light; a first wavelength-selective means selecting the wavelength of the first irradiation light; a second wavelength-selective means selecting the wavelength of the second irradiation light; a beam synthesizing means synthesizing the beam of the first irradiation light whose wavelength is selected and the beam of the second irradiation light whose wavelength is selected, into a single light beam; a first objective lens introducing the light beam synthesized by the beam synthesizing means in a direction in which a specimen is irradiated; a second objective lens placed opposite to the first objective lens, with the specimen between them; imaging elements imaging fluorescent light from the specimen passing through the second objective lens, after being separated into fluorescent light excited by a first wavelength and fluorescent light excited by a second wavelength; and an image processing means processing fluorescent images formed by the imaging elements.

According to the present invention, it is possible to provide the illumination apparatus for the microscope in which the specimen is irradiated with light of a plurality of wavelengths at the same time and by the same irradiation intensity distribution and individual wavelengths and intensities of the light can be independently set, and the image processing apparatus using this illumination apparatus.

These objects as well as the features and advantages of the present invention will become apparent from the following detailed description of the preferred embodiments when taken in conjunction with the accompanying drawings.

BRIEF DESCRIPTION OF THE DRAWINGS

FIG. 12 is a view showing schematically the illumination apparatus for the fluorescence microscope according to a seventh embodiment in the present invention and the image processing apparatus using the illumination apparatus; and FIG. 13 is a view showing schematically the illumination apparatus for the fluorescence microscope according to a modified example of the seventh embodiment in the present invention and the image processing apparatus using the illumination apparatus;

DETAILED DESCRIPTION OF THE PREFERRED EMBODIMENTS

Figure 1:
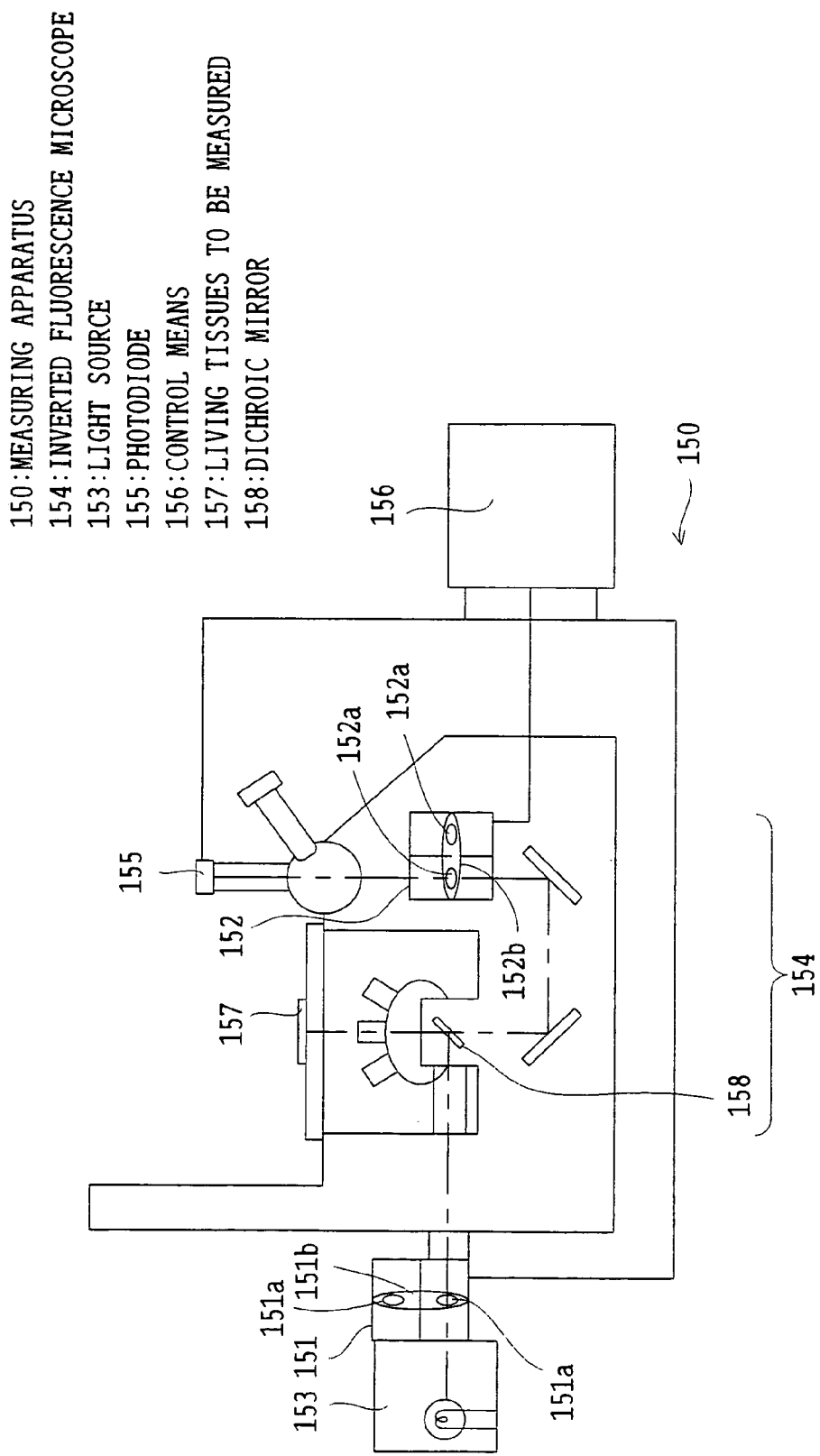
FIG. 1 is a view showing schematically a means for exciting a conventional multiple fluorescence specimen to irradiate the specimen with illumination light of a plurality of wavelengths.
Figure 2:
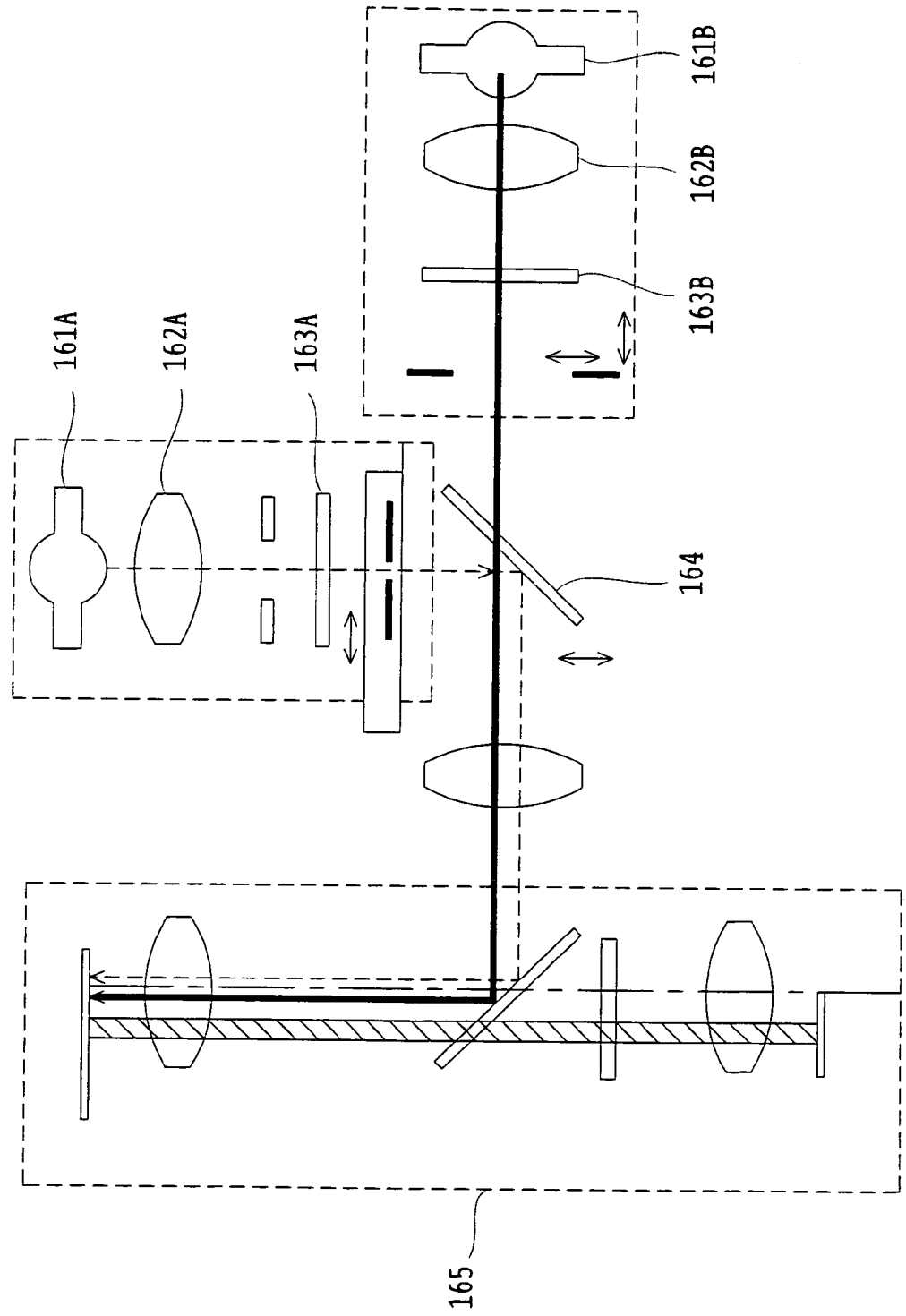
FIG. 2 is a view showing schematically another means for exciting a conventional multiple fluorescence specimen to irradiate the specimen with illumination light of a plurality of wavelengths.
Figure 3:
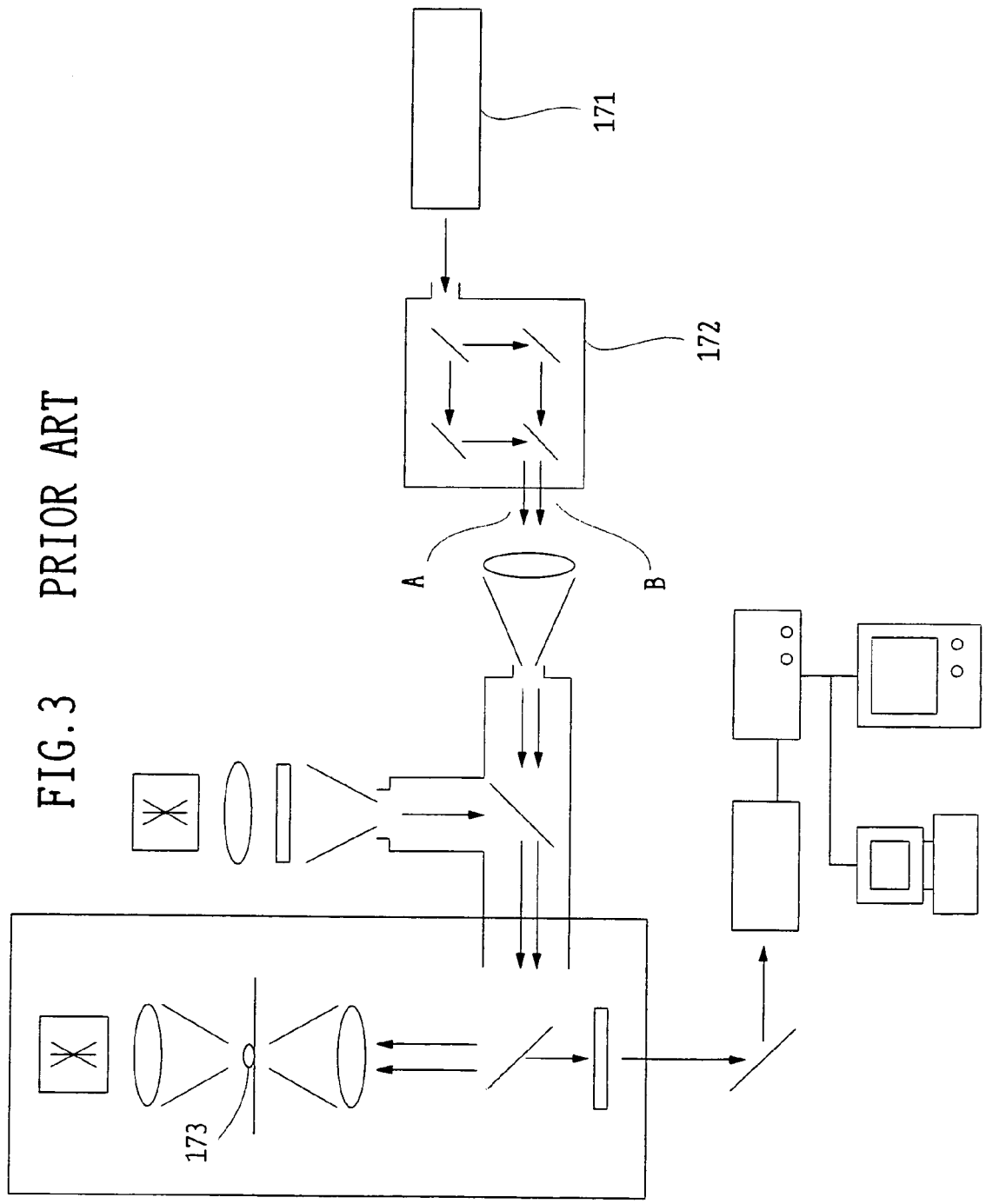
FIG. 3 is a view showing schematically an example of a conventional apparatus in which light from a single light source is divided so that the specimen is irradiated with the light.

Before undertaking the description of the embodiments, the function and effect of the present invention will be explained.

According to the present invention, a specimen can be illuminated with light in a plurality of, or two, different wavelength regions by only one light source, and thus uniform illumination becomes possible, without undergoing the influence of the difference of spatial intensity distribution between individual light sources as in the case where a plurality of light sources are used.

Furthermore, since the specimen can be excited with the light in a plurality of, or two, different wavelength regions by only one light source, it is avoidable that the difference of time fluctuation between individual light sources is produced as in the case where a plurality of light sources are used.

In addition, the sample can be completely illuminated with light of a plurality of, or two, different wavelengths at the same time.

Since the specimen can be excited with the light in a plurality of, or two, different wavelength regions, a ratio image can be securely obtained, without undergoing the influence of the difference of time fluctuation between individual light sources is produced as in the case where a plurality of light sources are used.

A fluorescence image completely excited with light of a plurality of, or two, different wavelengths at the same time can be obtained, and hence a phenomenon of a rapid change and a specimen of a quick motion can be observed.

Since the optimum excitation filter can be selected in accordance with the reflection peak wavelength of a mirror, there is no need to use an excitation filter which has the characteristic of a plurality of peak wavelengths, such as an expensive dual-peak excitation filter. As a result, cost can be reduced.

According to the present invention, excitation light and fluorescent light follow separate optical paths, and therefore it is not necessary that a dichroic mirror or a semi-transmissive mirror is introduced to separate the excitation light from the fluorescent light. Consequently, the excitation light and the fluorescent light can be efficiently transmitted, and in particular, when a dark fluorescent specimen is observed, a good effect is brought about.

Since an expensive dual dichroic mirror need not be used, cost can be reduced.

The present invention is preferably constructed as described below.

The illumination apparatus for the microscope according to the present invention and the image processing apparatus using this illumination apparatus further include a light-amount adjusting means adjusting the intensity of at least one of the plurality of beams of irradiation light.

The illumination apparatus for the microscope according to the present invention and the image processing apparatus using this illumination apparatus further include both a first light-amount adjusting means for adjusting the intensity of the first irradiation light and a second light-amount adjusting means for adjusting the intensity of the second irradiation light, or either of them.

According to the present invention, the balance between the intensities of a plurality of, or two, beams of excitation light can be arbitrarily changed, and even when the intensity of fluorescent light corresponding to one excitation light is extremely higher than that of fluorescent light corresponding to the other excitation light, the balance between the intensities of the excitation light is controlled to equalize the intensities of the fluorescent light corresponding to the excitation light with respect to the two beams. Whereby, a camera can be optimized to take advantage of the dynamic range.

An attenuation filter need not be switched in terms of time, and the occurrence of unwanted vibration is suppressed, so that it is avoidable that a focus position is shifted by the vibration.

It is desirable that the illumination apparatus for the microscope according to the present invention and the image processing apparatus using this illumination apparatus further include a polarization direction selective means for selecting the polarization direction of at least one of the plurality of beams of irradiation light.

It is also desirable that the illumination apparatus for the microscope according to the present invention and the image processing apparatus using this illumination apparatus further include both a first polarization direction selective means for selecting the polarization direction of the first irradiation light and a second polarization direction selective means for selecting the polarization direction of the second irradiation light, or either of them.

According to the present invention, in the use of a fluorescent substance that an excitation spectrum is of a double crest type and the profile of the excitation spectrum is changed in accordance with, for example, calcium ion concentration, the specimen is excited with excitation light of two wavelengths, at the same time, whose polarization directions are perpendicular to each other, and fluorescent light is produced. Of the fluorescent light, components of polarization directions identical with those of the excitation light are separately imaged. Moreover, the ratio between resulting two images is calculated to measure the ratio image, and thereby, for example, a change in calcium ion concentration can be completely measured at a time without any time shift. The phenomenon of a rapid change and the specimen of a quick motion can also be measured.

It is desirable that the illumination apparatus for the microscope according to the present invention and the image processing apparatus using this illumination apparatus further include a wavelength distribution monitoring means for monitoring the wavelength distribution of at least one of the plurality of beams of irradiation light.

It is also desirable that the illumination apparatus for the microscope according to the present invention and the image processing apparatus using this illumination apparatus further include a wavelength distribution monitoring means for monitoring both the wavelength distribution of the first irradiation light and the wavelength distribution of the second irradiation light, or one of them.

According to the present invention, the wavelength distribution of light incident on the specimen can be securely monitored.

In the illumination apparatus for the microscope according to the present invention and the image processing apparatus using this illumination apparatus, it is desirable that the mirror is a semi-transmissive mirror.

According to the present invention, by using the semi-transmissive mirror with little dependence of the reflectance and transmittance on wavelength, the excitation filter and a fluorescence filter can be optimally selected in accordance with the fluorescent substance used, without undergoing the restriction of the reflection characteristics of the mirror. Moreover, since the expensive dual dichroic mirror need not be used, cost can be reduced.

In the illumination apparatus for the microscope according to the present invention and the image processing apparatus using this illumination apparatus, it is desirable that each of the beam splitting means and the beam synthesizing means is the dichroic mirror.

According to the present invention, the dichroic mirror, in contrast with the semi-transmissive mirror used as each of the beam splitting means and the beam synthesizing means, is capable of keeping the loss of the excitation light to a minimum to excite the specimen, and hence, in particular, has an effect on the observation of a dark specimen.

In the illumination apparatus for the microscope according to the present invention and the image processing apparatus using this illumination apparatus, it is desirable that each of the beam splitting means and the beam synthesizing means is a polarization beam splitter.

According to the present invention, when the polarization beam splitter is used as each of the beam splitting means and the beam synthesizing means, the optical system can be simplified. Moreover, in contrast with the use of the semi-transmissive mirror, the loss of light emitted from the light source is small and the specimen can be efficiently illuminated with light.

Also, in the illumination apparatus for the microscope according to the present invention and the image processing apparatus using this illumination apparatus, it is desirable that at least one of a plurality of wavelength-selective means is placed to be movable in and out of the optical path split by the beam splitting means.

In the illumination apparatus for the microscope according to the present invention and the image processing apparatus using this illumination apparatus, it is desirable that at least one of the first wavelength-selective means and the second wavelength-selective means is placed to be movable in and out of the optical path split by the beam splitting means.

In accordance with the drawings, the embodiments of the present invention will be described below.

First Embodiment

Figure 4:
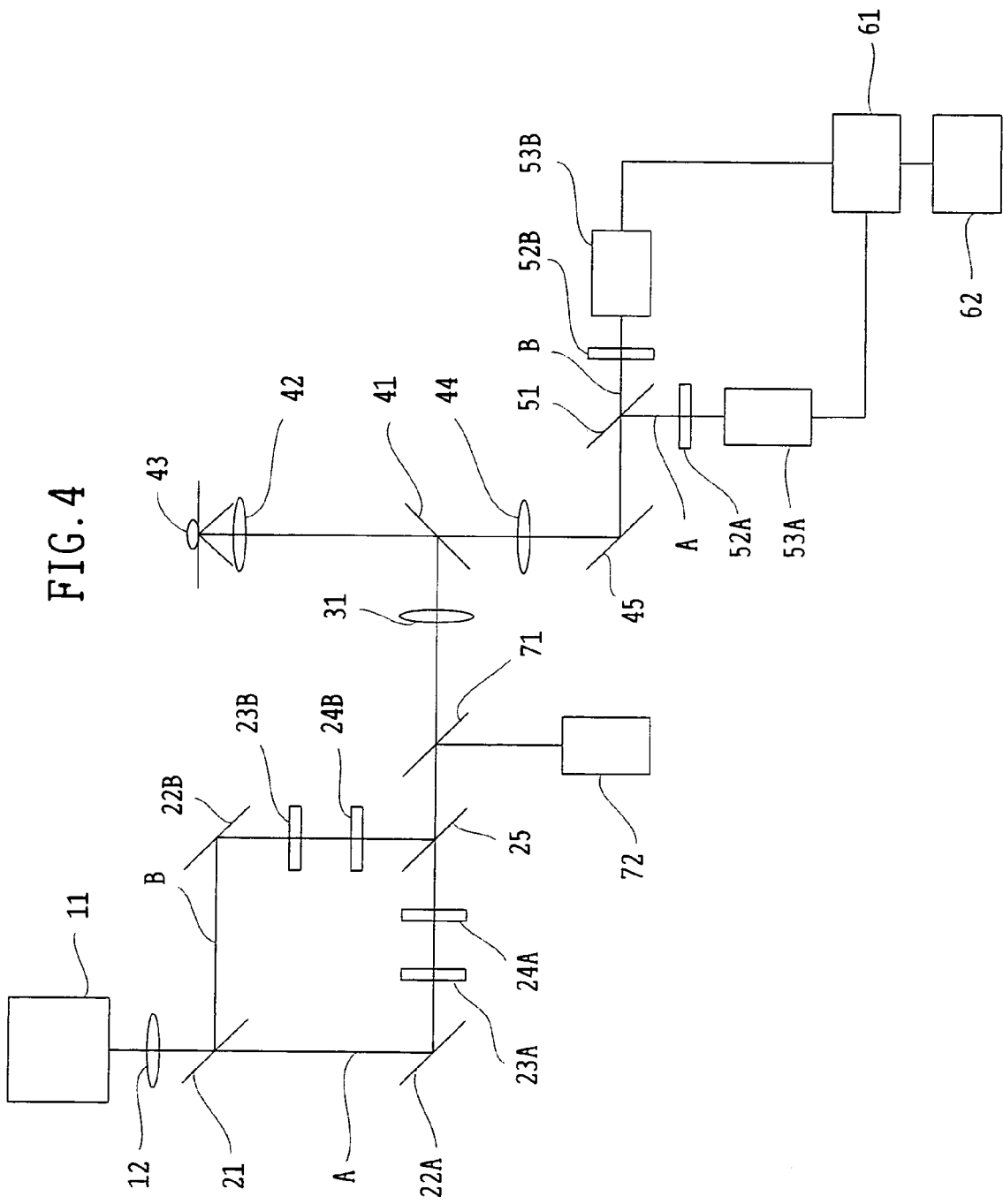
FIG. 4 is a view showing schematically the illumination apparatus for a fluorescence microscope according to a first embodiment in the present invention and the image processing apparatus using the illumination apparatus.

FIG. 4 shows the illumination apparatus for the fluorescence microscope according to the first embodiment in the present invention and the image processing apparatus using the illumination apparatus.

The illumination apparatus for the fluorescence microscope of the first embodiment and the image processing apparatus using the illumination apparatus include a light source 11 for white light turned on by an arc, a filament, or an LED; a semi-transmissive mirror 21 which is a beam splitting means splitting a light beam emitted from the light source 11 into two beams of first irradiation light and second irradiation light; an excitation filter 24A which is a first wavelength-selective means selecting the wavelength of the first irradiation light; an excitation filter 24B which is a second wavelength-selective means selecting the wavelength of the second irradiation light; a semi-transmissive mirror 25 which is a beam synthesizing means synthesizing the beam of the first irradiation light whose wavelength is selected and the beam of the second irradiation light whose wavelength is selected, into a single light beam; a dichroic mirror 41 which is a mirror introducing the light beam synthesized by the semi-transmissive mirror 25 in a direction in which a specimen 43 is irradiated and transmitting light from the specimen 43; an objective lens 42 interposed between the dichroic mirror 41 and the specimen 43; cameras 53A and 53B which are imaging elements imaging fluorescent light from the specimen 43 passing through the objective lens 42 and the dichroic mirror 41, after being separated into fluorescent light beams excited by individual wavelengths; and an image processing section 61 which is an image processing means processing fluorescent images formed by the cameras 53A and 53B.

The light source is constructed with a mercury lamp or a xenon lamp, emitting light ranging from the ultraviolet wavelength region to the visible wavelength region. Light emitted from the light source 11 is incident on a collector lens 12. The collector lens 12 is designed to convert the light from the light source 11 into a parallel beam. The light converted into the parallel beam through the collector lens 12 is incident on the semi-transmissive mirror 21 which is the beam splitting means.

The semi-transmissive mirror 21 has the function of reflecting a part of an incident beam and transmitting the remaining. A reflecting mirror 22A, an attenuation filter 23A, and the excitation filter 24A are arranged on the optical path of a light beam A transmitted through the semi-transmissive mirror 21. A reflecting mirror 22B, an attenuation filter 23B, and the excitation filter 24B are arranged on the optical path of a light beam B reflected by the semi-transmissive mirror 21.

The reflecting mirrors 22A and 22B are provided with tilt adjusting mechanisms (not shown) so that after the light beam A and B travel through the semi-transmissive mirror 25, their traveling directions and positions on the optical paths are made to coincide completely.

The attenuation filters 23A and 23B are such that the amounts of light of the light beams A and B, respectively, can be separately adjusted. The attenuation filters 23A and 23B are provided to be easily movable in and out of the optical paths of the light beams A and B through turrets or sliders.

The excitation filters 24A and 24B have properties of transmitting only light in particular wavelength regions of the light beams A and B, respectively, and are provided to be easily movable in and out of the optical paths of the light beams A and B through turrets or sliders.

The semi-transmissive mirror 25 has properties of transmitting a part of the light beam A and reflecting a part of the light beam B. In the light beams A and B after traveling through the semi-transmissive mirror 25, their traveling directions and positions on the optical paths are in complete agreement by making tilt adjustments of the reflecting mirrors 22A and 22B through the tilt adjusting mechanisms.

In FIG. 4, reference numeral 31 represents a projection lens conducting the source image of the light beams A and B synthesized by the semi-transmissive mirror 25 to the pupil surface of the objective lens 42, and 44 represents an imaging lens imaging the fluorescent light from the specimen 43 transmitted through the dichroic mirror 41, after being reflected by a reflecting mirror 45, on the imaging surfaces of the cameras 53A and 53B.

The dichroic mirror 41 is constructed with a dual dichroic mirror which has the reflection characteristic of two reflection peak wavelengths so as to reflect light transmitted through the projection lens 31 toward the objective lens 42 and to transmit the fluorescent light emanating from the specimen 43.

Also, in this figure, reference numeral 51 denotes a dichroic mirror transmitting or reflecting the fluorescent light from the specimen 43, depending on its wavelength, and 52A and 52B denote fluorescence filters transmitting only light in particular wavelength regions of a light beam A' and a light beam B', split through the dichroic mirror 51. The fluorescence filters 52A and 52B are provide to be easily movable in and out of the optical paths of the light beams A' and B' through turrets or sliders.

The cameras 53A and 53B are provided to image the light beams A' and B' transmitted through the fluorescence filters 52A and 52B, respectively.

The image processing section 61 is constructed so that electric signals output from the cameras 53A and 53B are stored in a memory and various calculations of resulting fluorescent images of the specimen 43 are performed. Reference numeral 62 denotes an image display section. The image display section 62 has the function of displaying the images processed by the image processing section 61.

In the first embodiment, a semi-transmissive mirror 71 is interposed between the semi-transmissive mirror 25 and the projection lens 31 so that a part of each of the light beams A and B transmitted through and reflected by the semi-transmissive mirror 25 is rendered incident on a spectroscope 72 through the semi-transmissive mirror 71. The spectroscope 72 has the function of measuring the wavelength distribution of light of each of the incident light beams A and B.

According to the illumination apparatus for the fluorescence microscope in the first embodiment and the image processing apparatus using the illumination apparatus, when the light source 11 is turned on, light emitted form the light source 11 is converted into a parallel beam through the collector lens 12 and is split into two light beams A and B through the semi-transmissive mirror 21.

The light beam A transmitted through the semi-transmissive mirror 21, after being reflected by the reflecting mirror 22A, is transmitted through the attenuation filter 23A at a preset transmittance. Then, light in a preset wavelength region is transmitted through the excitation filter 24A and is incident on the semi-transmissive mirror 25. The light beam A transmitted through the semi-transmissive mirror 25 and then the semi-transmissive mirror 71 passes through the projection lens 31 and is reflected by the dichroic mirror 41 to irradiate the specimen 43 through the objective lens 42. The specimen 43 is irradiated with the light beam A and thereby is excited to emit fluorescent light.

The fluorescent light emitted from the specimen 43 by irradiation with the light beam A travels through the object lens 42 in a reverse direction, is transmitted through the dichroic mirror 41 and the imaging lens 44, and after being reflected by the reflecting mirror 45, is reflected by the dichroic mirror 51. Subsequently, the light is transmitted through the fluorescence filter 52A and is imaged as a fluorescent image by the camera 53A.

On the other hand, the light beam B reflected by the semi-transmissive mirror 21, after being reflected by the reflecting mirror 22B, is transmitted through the attenuation filter 23B at a preset transmittance. Then, light in a preset wavelength region is transmitted through the excitation filter 24B and is incident on the semi-transmissive mirror 25. The light beam B reflected by the semi-transmissive mirror 25 and transmitted through the semi-transmissive mirror 71 passes through the projection lens 31 and is reflected by the dichroic mirror 41 to irradiate the specimen 43 through the objective lens 42. The specimen 43 is irradiated with the light beam B and thereby is excited to emit fluorescent light.

The fluorescent light emitted from the specimen 43 by irradiation with the light beam B travels through the object lens 42 in a reverse direction, is transmitted through the dichroic mirror 41 and the imaging lens 44, and after being reflected by the reflecting mirror 45, is transmitted through the dichroic mirror 51. Subsequently, the light is transmitted through the fluorescence filter 52B and is imaged as a fluorescent image by the camera 53B.

The fluorescent images of the specimen 43 formed by the cameras 53A and 53B are such that the luminance ratio between the images is calculated in the image processing section 61, and an original image and a ratio image are displayed on the image display section 62.

A part of each of the light beams A and B traveling through the semi-transmissive mirror 25 is reflected by the semi-transmissive mirror 71 and is incident on the spectroscope 72 so that its wavelength distribution is monitored.

Thus, according to the illumination apparatus for the fluorescence microscope in the first embodiment and the image processing apparatus using the illumination apparatus, the specimen can be illuminated with light in two different wavelength regions by only the single light source 11, and thus uniform illumination becomes possible without undergoing the influence of the difference between spatial intensity distributions caused by field variations of individual light sources as in the conventional apparatus using a plurality of light sources.

Since the specimen can be excited with light in two different wavelength regions by only the single light source 11, the ratio image can be securely obtained without undergoing the influence of characteristic variations caused by changes of individual light sources with aging or the difference between time fluctuations by noise as in the conventional apparatus using a plurality of light sources.

The fluorescent image completely excited with light of two different wavelengths at the same time can be secured, and therefore, the phenomenon of a rapid change and the specimen of a quick motion can be viewed on a multiple fluorescence observation.

Since the optimum excitation filter can be selected in accordance with the reflection peak wavelength of the dichroic mirror 41, there is no need to use an expensive dual-peak excitation filter and as a result, cost can be reduced.

Moreover, the balance between the intensities of two beams of excitation light can be arbitrarily changed, and even when the intensity of fluorescent light corresponding to one excitation light is extremely higher than that of fluorescent light corresponding to the other excitation light, the balance between the intensities of the excitation light is controlled to equalize the intensities of the fluorescent light corresponding to the excitation light with respect to the two beams. Whereby, the dynamic range of the camera can be optimized.

The attenuation filter need not be switched in terms of time, and the occurrence of unwanted vibration is suppressed, so that it is avoidable that a focus position is shifted by the vibration. The wavelength distribution of light incident on the microscope can be securely monitored by the spectroscope 72.

Figure 5:
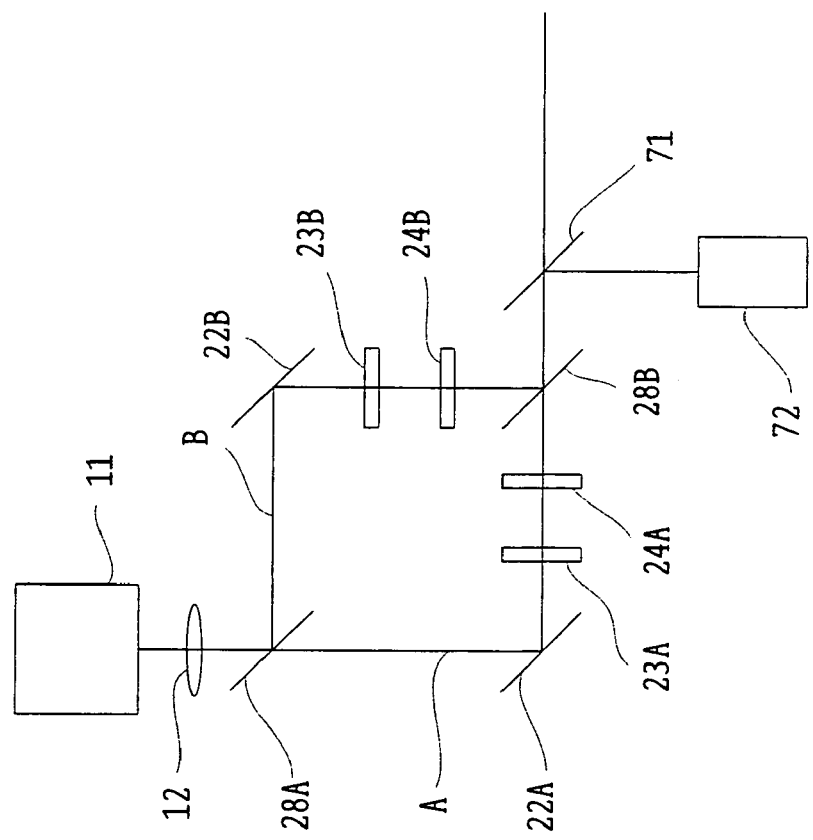
FIG. 5 is a view showing schematically the illumination section of the fluorescence microscope according to a modified example of the first embodiment in the present invention.

FIG. 5 shows a modified example of the illumination section of the first embodiment in the present invention. Like numerals are used for like components with respect to the embodiment of FIG. 4, and their detailed explanation is omitted. In FIG. 4, the semi-transmissive mirrors 21 and 25 are used as the beam splitting means and the beam synthesizing means, respectively, but instead of these, as shown in FIG. 5, dichroic mirrors 28A and 28B may be used. Each of the dichroic mirrors 28A and 28B has properties of reflecting incident light of shorter wavelengths than a certain wavelength $\lambda$ and transmitting incident light of longer wavelengths than the wavelength $\lambda$.

In this modified example, an excitation filter which includes longer wavelengths than the wavelength $\lambda$ in the transmission wavelength region is used for the excitation filter 24A, and an excitation filter which includes shorter wavelengths than the wavelength $\lambda$ in the transmission wavelength region is used for the excitation filter 24 B.

According to the illumination section of the modified example constructed as mentioned above, light of longer wavelengths than the wavelength λ, of light from the light source 11, is transmitted through the dichroic mirror 28A and is reflected by the reflecting mirror 22A. The light is then transmitted through the attenuation filter 23A and the excitation filter 24A, and after being transmitted through the dichroic mirror 28B, is conducted toward the specimen 43. On the other hand, light of shorter wavelengths than the wavelength λ, of light from the light source 11, is reflected by the dichroic mirror 28A and the reflecting mirror 22B and is transmitted through the attenuation filter 23B and the excitation filter 24B. The light is then reflected by the dichroic mirror 28B and is conducted toward the specimen 43.

Thus, according to the light source section of the modified example, in contrast with the case where the semi-transmissive mirrors 21 and 25 such as those shown in FIG. 4 are used as the beam splitting means and the beam synthesizing means, respectively, a loss of the excitation light is kept to a minimum and the specimen can be excited. Consequently, when a dark specimen is observed, a good effect is particularly secured.

Also, the semi-transmissive mirror 21 or 25 in the first embodiment, or the dichroic mirror 28A or 28B is merely cited as an example of the beam splitting means or the beam synthesizing means, and such a means is not limited to the mirror. As an alternative example of the beam splitting means or the beam synthesizing means, for instance, a bifurcated bundle fiber (not shown) may be used.

When the bifurcated bundle fiber is used instead of the semi-transmissive mirror 21, it is only necessary to place the combined end of the bundle fiber immediately behind the collector lens 12 and the bifurcated ends of the bundle fiber immediately before the reflecting mirrors 22A and 22B. By doing so, even though the light emitted from the light source 11 is not completely converted into the parallel beam by the collector lens 12, the light can be rendered incident on the reflecting mirrors 22A and 22B if it only enters the bundle fiber, and thus the adjustment of the optical system is facilitated.

When the bifurcated bundle fiber is used instead of the semi-transmissive mirror 25, it is only necessary to place the bifurcated ends of the bundle fiber immediately behind the excitation filters 24 A and 24B. By doing so, the light transmitted through the excitation filters 24A and 24B can be synthesized if it only enters the bifurcated ends of the bundle fiber, and hence the number of degrees of placement freedom of the attenuation filters 23 A and 23B and the excitation filters 24A and 24B can be increased.

Also, the excitation filter 24A or 24B in the first embodiment is merely cited as an example of the wavelength-selective means, and such a means is not limited to the filter. As an alternative example of the wavelength-selective means, for instance, a monochromater may be used instead of the excitation filter 24A or 24B. By doing so, a plurality of excitation filters need not be previously provided.

Instead of the dichroic mirror 51, a semi-transmissive mirror may be used. In this case, since the semi-transmissive mirrors are almost uniform in their wavelength characteristics of the reflectance and transmittance, it becomes possible to save time such that, as in the case where the dichroic mirror 51 is used, the mirror must be replaced with the dichroic mirror 51 which has the property of transmitting or reflecting the fluorescent light each time a fluorescent substance in the specimen is changed.

Second Embodiment

Figure 6:
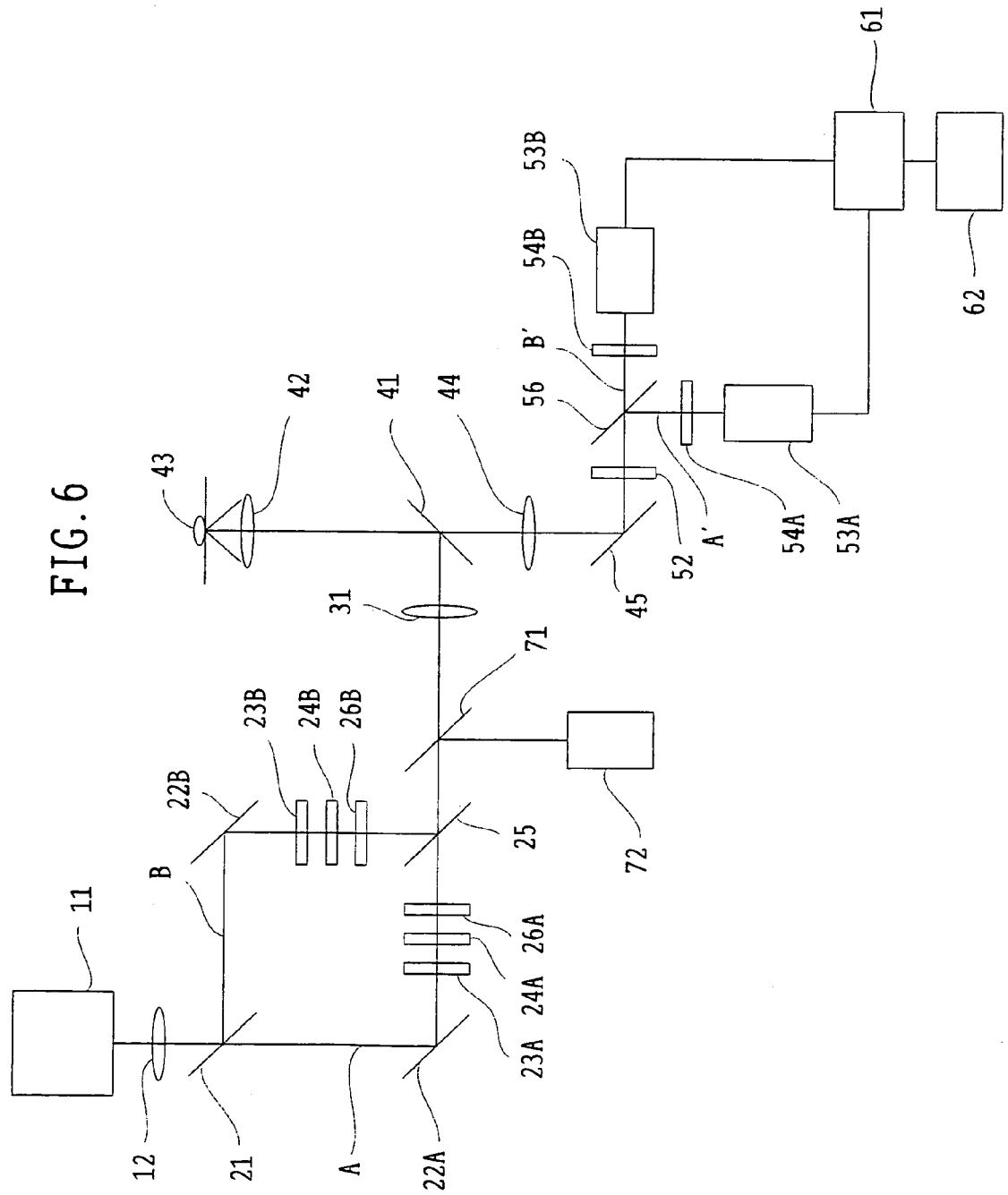
FIG. 6 is a view showing schematically the illumination apparatus for the fluorescence microscope according to a second embodiment in the present invention and the image processing apparatus using the illumination apparatus.

FIG. 6 shows the illumination apparatus for the fluorescence microscope according to the second embodiment in the present invention and the image processing apparatus using the illumination apparatus. Like numerals are used for like components with respect to the embodiment of FIG. 4, and their detailed explanation is omitted.

In the second embodiment, besides the reflecting mirror 22A, the attenuation filter 23A, and the excitation filter 24A, a polarizing plate 26A is placed on the optical path of the light beam A transmitted through the semi-transmissive mirror 21. Similarly, besides the reflecting mirror 22B, the attenuation filter 23B, and the excitation filter 24B, a polarizing plate 26B is placed on the optical path of the light beam B reflected by the semi-transmissive mirror 21. Each of the polarizing plates 26A and 26B has the property of selecting the polarization direction of the incident beam from the light source 11.

In the second embodiment, a fluorescence filter 52 and a semi-transmissive mirror 56 dividing a light beam transmitted through the fluorescence filter 52 into the light beam A' and the light beam B' are arranged on the optical path of the reflection side of the reflecting mirror 45. A polarizing plate 54A and a polarizing plate 54B are placed on the optical paths of the two light beams A' and B' divided through the semi-transmissive mirror 56 so that fluorescent light transmitted through the polarizing plates 54A and 54B is imaged by the cameras 53A and 53B, respectively. The fluorescence filter 52 has the property of transmitting only light in a particular wavelength region, of light from the specimen 43. The polarizing plates 54A and 54B have properties of transmitting only light of components in particular polarization directions of the light beams A' and B' divided by the semi-transmissive mirror 56.

Here, a description will be given of the relationships of directions of transmission polarization axes between the polarizing plates 26A and 26B and between the polarizing plates 54A and 54B. In the polarizing plates 26A and 26B, their transmission polarization axes are perpendicular to each other, and in the polarizing plates 54A and 54B, their transmission polarization axes are perpendicular to each other. In the polarizing plates 26A and 54A, their transmission polarization axes are parallel to each other, and in the polarizing plates 26B and 54B, their transmission polarization axes are parallel to each other.

By doing so, the polarization direction of the fluorescent light from the specimen 43 excited by the light beam A with a preset polarization direction transmitted through the polarizing plate 26A is governed by a component parallel to the polarization direction of the excitation light (the light beam A). Therefore, the component can be transmitted through the polarizing plate 54A, but not the polarizing plate 54B. Conversely, of the fluorescent light from the specimen 43, a component perpendicular to the polarization direction of the excitation light (the light beam A) can be transmitted through the polarizing plate 54B, but not the polarizing plate 54A. On the other hand, the polarization direction of the fluorescent light from the specimen 43 excited by the light beam B with a preset polarization direction transmitted through the polarizing plate 26B is governed by a component parallel to the polarization direction of the excitation light (the light beam B). Therefore, the component can be transmitted through the polarizing plate 54B, but not the polarizing plate 54A. Conversely, of the fluorescent light from the specimen 43, a component perpendicular to the polarization direction of the excitation light (the light beam B) can be transmitted through the polarizing plate 54A, but not the polarizing plate 54B.

According to the illumination apparatus for the fluorescence microscope of the second embodiment constructed as mentioned above and the image processing apparatus using the illumination apparatus, when the light source 11 is turned on, light emitted form the light source 11 is converted into a parallel beam through the collector lens 12, and after being incident on the semi-transmissive mirror 21, is split into two light beams A and B.

The light beam A transmitted through the semi-transmissive mirror 21, after being reflected by the reflecting mirror 22A, is transmitted through the attenuation filter 23A at a preset transmittance. Then, light in a preset wavelength region is transmitted through the excitation filter 24A, and light of a component with a preset polarization direction is selected through the polarizing plate 26A and is incident on the semi-transmissive mirror 25. The light beam A transmitted through the semi-transmissive mirror 25 and then the semi-transmissive mirror 71 passes through the projection lens 31 and is reflected by the dichroic mirror 41 to irradiate the specimen 43 through the objective lens 42. The specimen 43 is irradiated with the light beam A and thereby is excited to emit fluorescent light.

Also, in the second embodiment, as fluorescent substances in the specimen 43, ones which are heavy in molecular weight, such as GFP (green fluorescent protein) and RFP (red fluorescent protein), are used. When the molecular weight is heavy, the rotary motion of the fluorescent substance is slow. In addition, the polarization direction of the fluorescent light emanating from the specimen 43 is governed by the component parallel to the polarization direction of the excitation light with which the specimen is irradiated, and the ratio between this component parallel and the component perpendicular to the polarization direction of the excitation light becomes nearly constant.

The fluorescent light emitted from the specimen 43 by irradiation with the light beam A travels through the object lens 42 in a reverse direction, is transmitted through the dichroic mirror 41 and the imaging lens 44, and after being reflected by the reflecting mirror 45 and transmitted through the fluorescence filter 52, is transmitted through and reflected by the semi-transmissive mirror 56. Subsequently, of the fluorescent light, the component parallel to the polarization direction of the light beam A is transmitted through the polarizing plate 54A and is imaged as a fluorescent image by the camera 53A, while the component perpendicular thereto is transmitted through the polarizing plate 54B and is imaged as a fluorescent image by the camera 53B.

On the other hand, the light beam B reflected by the semi-transmissive mirror 21, after being reflected by the reflecting mirror 22B, is transmitted through the attenuation filter 23B at a preset transmittance. Then, light in a preset wavelength region is transmitted through the excitation filter 24B, and light of a component with a preset polarization direction is selected through the polarizing plate 26B and is incident on the semi-transmissive mirror 25. The light beam B reflected by the semi-transmissive mirror 25 and transmitted through the semi-transmissive mirror 71 passes through the projection lens 31 and is reflected by the dichroic mirror 41 to irradiate the specimen 43 through the objective lens 42. The specimen 43 is irradiated with the light beam B and thereby is excited to emit fluorescent light.

The fluorescent light emitted from the specimen 43 by irradiation with the light beam B travels through the object lens 42 in a reverse direction, is transmitted through the dichroic mirror 41 and the imaging lens 44, and after being reflected by the reflecting mirror 45, is transmitted through the fluorescence filter 52. Then, part of the light is transmitted through the semi-transmissive mirror 56 and the remainder is reflected thereby. Subsequently, of the fluorescent light, the component parallel to the polarization direction of the light beam B is transmitted through the polarizing plate 54B and is imaged as a fluorescent image by the camera 53B, while the component perpendicular thereto is transmitted through the polarizing plate 54A and is imaged as a fluorescent image by the camera 53A.

Next, reference is made to effects brought about by the construction and function of the second embodiment. In the use of a fluorescent substance that an excitation spectrum is of a double crest type and the profile of the excitation spectrum is changed in accordance with, for example, calcium ion concentration, it has formerly been difficult that the specimen is illuminated with excitation light of two wavelengths corresponding to the double crest at the same time and a change of the calcium ion concentration is extracted from fluorescent light emanating therefrom.

According to the illumination apparatus for the fluorescence microscope of the second embodiment and the image processing apparatus using the illumination apparatus, however, as mentioned above, the specimen is excited with the excitation light of two wavelengths, at the same time, whose polarization directions are perpendicular to each other, and fluorescent light is produced. Of the fluorescent light, two components whose polarization directions are perpendicular to each other are imaged simultaneously by the two cameras, and then when calculations are performed on the basis of resulting two images, the fluorescent images equivalent to that obtained where the specimen is excited with each of the excitation light of individual wavelengths can be separately found. Moreover, the ratio between the two images is calculated to measure the ratio image, and thereby, for example, a change in the calcium ion concentration can be completely measured at a time without any time shift. The phenomenon of a rapid change and the specimen of a quick motion can also be measured.

Also, although in the second embodiment the polarizing plates 26A and 26B are used as the polarization direction selective means, polarization beam splitters may be used instead of these polarizing plates.

Figure 7:
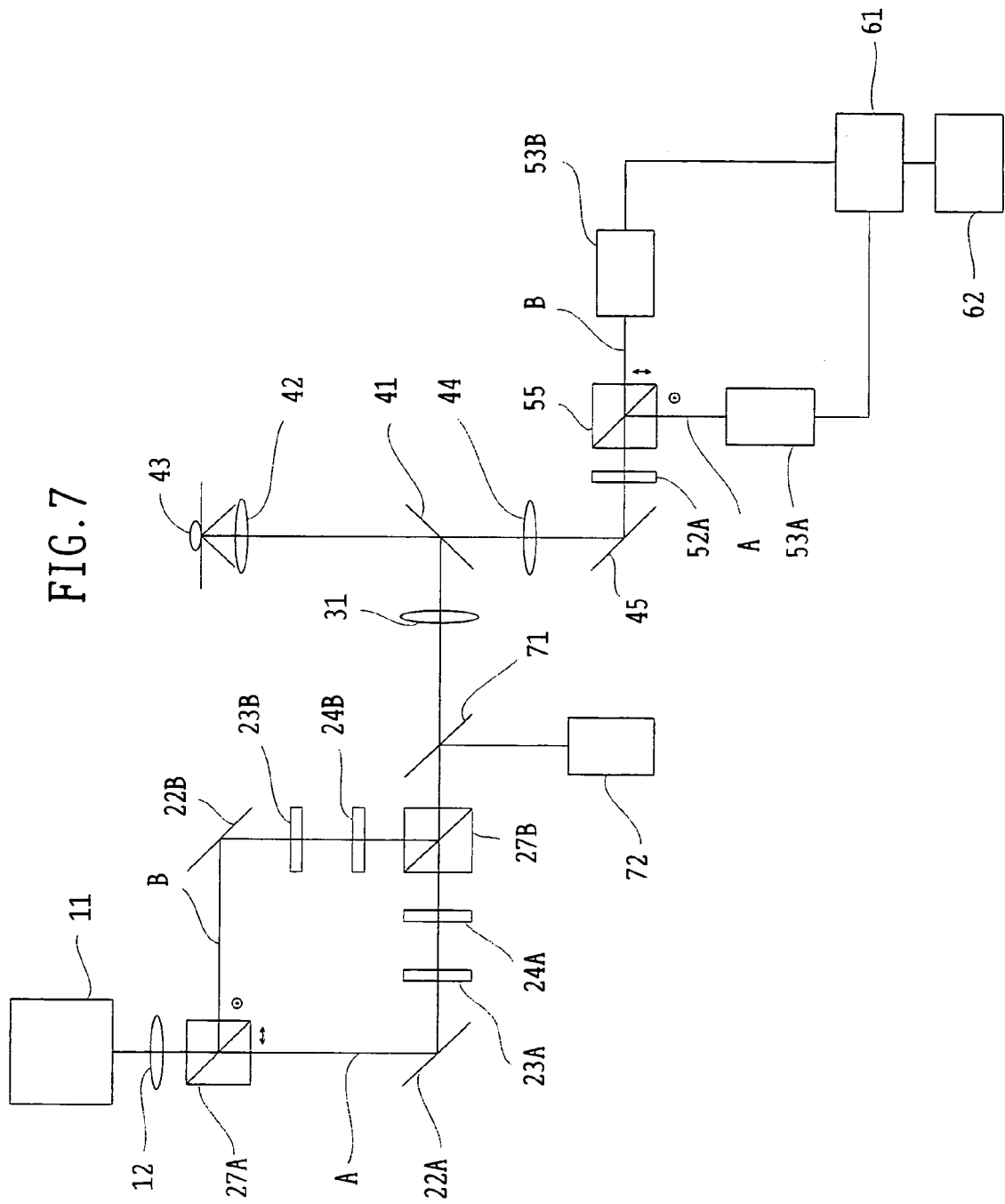
FIG. 7 is a view showing schematically the illumination apparatus for the fluorescence microscope according to a modified example of the second embodiment in the present invention and the image processing apparatus using the illumination apparatus.

FIG. 7 shows a modified example of the second embodiment. Like numerals are used for like components with respect to FIGS. 4 and 6, and their detailed explanation is omitted. This modified example, instead of using the semi-transmissive mirrors 21 and 25 of FIG. 4, uses polarization beam splitters 27A and 27B. The polarization beam splitter 27A is located at the position where the parallel beam passing through the collector lens 12 is incident thereon.

The polarization beam splitter 27A has properties of transmitting light of a component whose polarization direction is parallel to the plane of the page, of an incident light beam, and reflecting light of a component whose polarization direction is perpendicular to the plane of the page, and is constructed so that the incident beam is split into the light beams A and B in accordance with polarization directions. The reflecting mirror 22A, the attenuation filter 23A, and the excitation filter 24A are arranged on the optical path of the light beam A transmitted through the polarization beam splitter 27A. The reflecting mirror 22B, the attenuation filter 23B, and the excitation filter 24B are arranged on the optical path of the light beam B reflected by the polarization beam splitter 27A.

The polarization beam splitter 27B is located at the position where the light beam A traveling through the excitation filter 24A and the light beam B traveling through the excitation filter 24B are incident thereon. The polarization beam splitter 27B has the same function as the polarization beam splitter 27A to transmit the light beam A of a polarization component parallel to the plane of the page and to reflect the light beam B of a polarization component perpendicular to the plane of the page. Whereby, the light beams A and B are synthesized.

In the modified example, the fluorescence filter 52A and a polarization beam splitter 55 splitting the light beam transmitted through the fluorescence filter 52A into the light beam A' and B' in accordance with polarization directions are arranged on the optical path of the reflection side of the reflecting mirror 45 so that fluorescent light split by the polarization beam splitter 55 is imaged by the cameras 53A and 53B. The polarization beam splitter 55 has properties of transmitting light of a component whose polarization direction is parallel to the plane of the page, of an incident light beam, and reflecting light of a component whose polarization direction is perpendicular to the plane of the page, and is constructed so that the incident beam is split into the light beams A' and B' in accordance with polarization directions.

According to the illumination apparatus for the fluorescence microscope of the second embodiment constructed as mentioned above and the image processing apparatus using the illumination apparatus, the polarization beam splitters 27A and 27B, in addition to the function of the polarization direction selective means, also has the functions of the beam splitting means and the beam synthesizing means. Consequently, the semi-transmissive mirrors 21 and 25 can be eliminated and the simplification of the optical system becomes possible. In the modified example, the polarization beam splitters 27A and 27B, in contrast with the semi-transmissive mirrors 21 and 25, is capable of reducing a loss of the light from the light source 11. Hence, the specimen can be efficiently irradiated with the light. Since the polarization beam splitter 55 plays the roles of the semi-transmissive mirror 56 and the polarizing plates 54A and 54B, not only is the optical system simplified, but also the stability of the system is improved. Furthermore, the polarization beam splitter 55, in contrast with the semi-transmissive mirror 56, is capable of reducing the loss of the light emanating from the specimen, and thus the fluorescent light can be efficiently detected.

According to the modified example, the specimen can be excited with light in two different wavelength regions by only the single light source 11, and therefore the same effect as in the first embodiment of FIGS. 4 and 5 is brought about. The same effect as in the construction of FIG. 6 is also secured.

Third Embodiment

Figure 8:
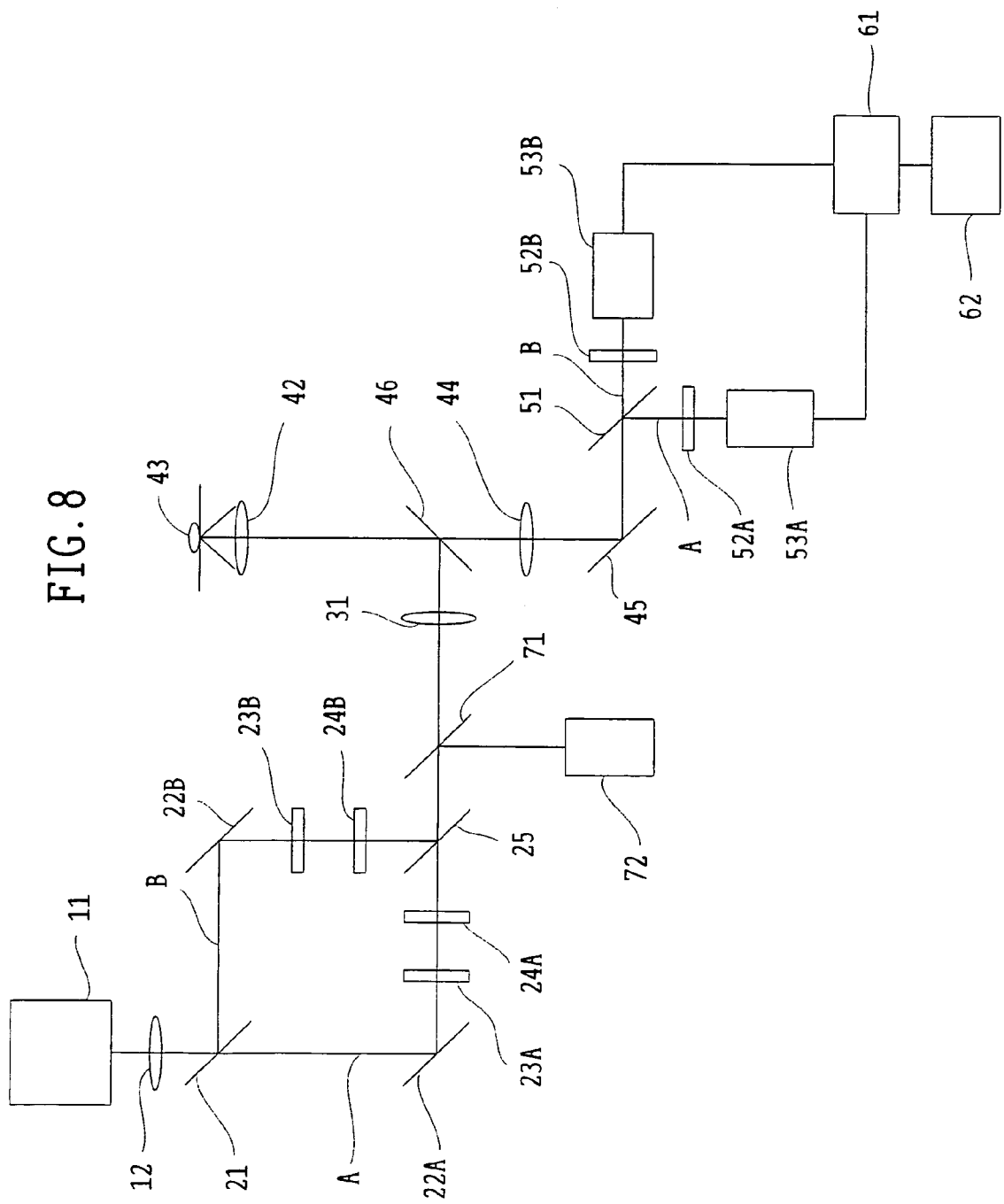
FIG. 8 is a view showing schematically the illumination apparatus for the fluorescence microscope according to a third embodiment in the present invention and the image processing apparatus using the illumination apparatus.

FIG. 8 shows the illumination apparatus for the fluorescence microscope according to the third embodiment in the present invention and the image processing apparatus using the illumination apparatus. Like numerals are used for like components with respect to the embodiment of FIG. 4, and their detailed explanation is omitted. In the third embodiment, instead of the dichroic mirror 41 in the apparatus of the first embodiment shown in FIG. 4, a semi-transmissive mirror 46 is placed. The semi-transmissive mirror 46 has the function of reflecting a part of the incident light and transmitting the remainder, and possesses the property that there is little dependence of the reflectance and transmittance on wavelength. At the semi-transmissive mirror 46, parts of the light beams A and B synthesized by the semi-transmissive mirror 25 are reflected toward the objective lens 42, and part of the fluorescent light emanating from the specimen 43 is transmitted.

According to the illumination apparatus for the fluorescence microscope of the third embodiment constructed as mentioned above and the image processing apparatus using the illumination apparatus, the third embodiment uses the semi-transmissive mirror 46 in which there is little dependence of the reflectance and transmittance on wavelength, and thus, unlike the embodiments using the dichroic mirror 41, is not restricted to the reflection characteristic so that the excitation filters and the fluorescence filters can be optimally selected in accordance with the fluorescent substance used in the specimen 43. Moreover, since an expensive dual dichroic mirror need not be used, cost can be reduced. The specimen can be excited with light in two different wavelength regions by only the single light source 1, and hence the same effect as in the first embodiment is brought about.

Fourth Embodiment

Figure 9:
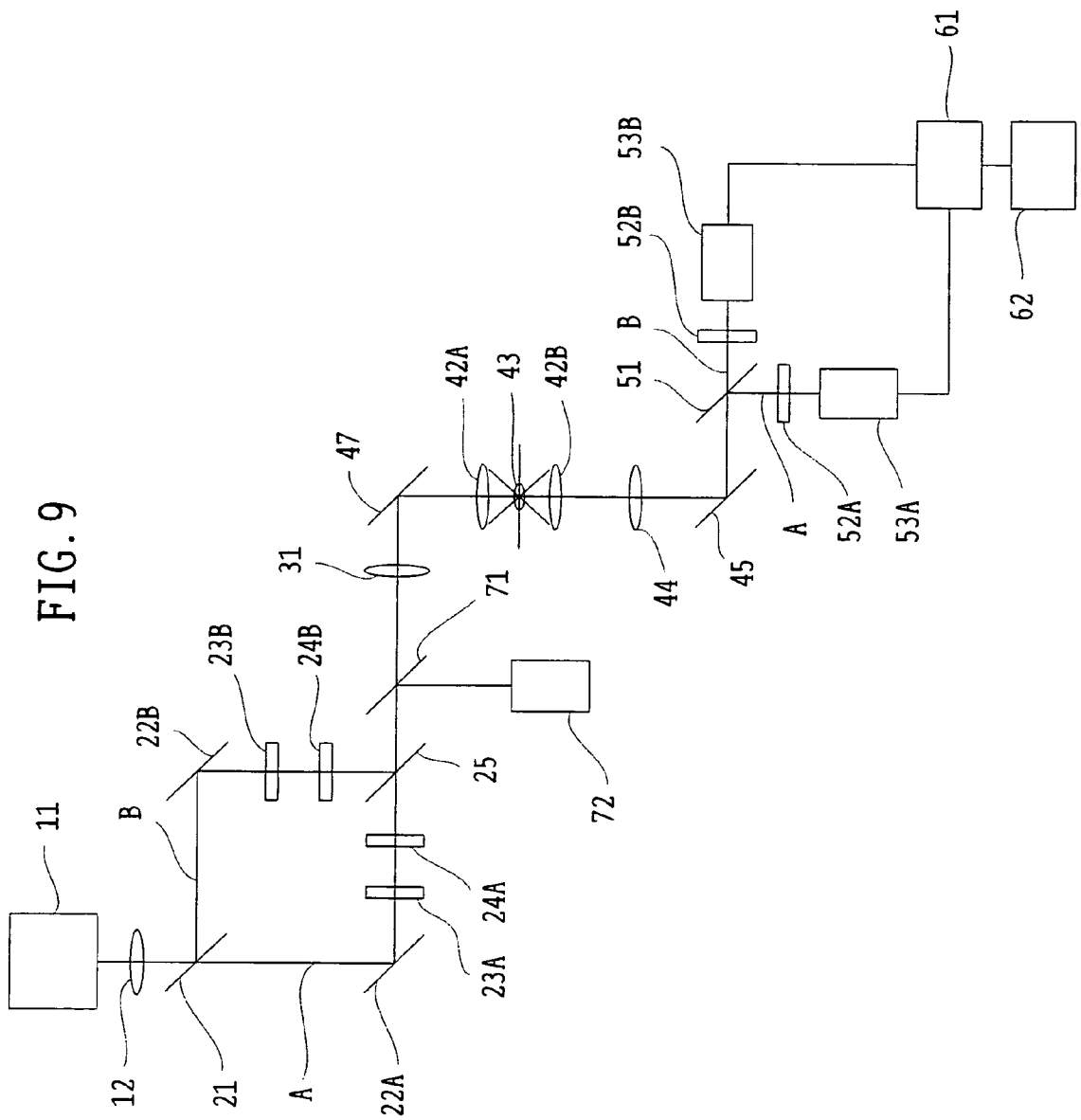
FIG. 9 is a view showing schematically the illumination apparatus for the fluorescence microscope according to a fourth embodiment in the present invention and the image processing apparatus using the illumination apparatus.

FIG. 9 shows the illumination apparatus for the fluorescence microscope according to the fourth embodiment in the present invention and the image processing apparatus using the illumination apparatus. Like numerals are used for like components with respect to the embodiment of FIG. 4, and their detailed explanation is omitted. The fourth embodiment is different from the first embodiment of FIG. 4 in an arrangement on the optical path extending from the semi-transmissive mirror 71 to the reflecting mirror 45. On this optical path, the projection lens 31, a reflecting mirror 47, a first objective lens 42A, a second objective lens 42B, and the imaging lens 44 are arranged so that a transmission-type fluorescence observation is made.

The projection lens 31 conducts a source image in which the light beams A and B are synthesized by the semi-transmissive mirror 25 to the pupil surface of the first objective lens 42A. The reflecting mirror 47 reflects light transmitted through the projection lens 31 to conduct the light to the first objective lens 42A. The first objective lens 42A is provided so that the specimen 43 is irradiated with the light beam synthesized by the semi-transmissive mirror 25. The second objective lens 42B is placed opposite to the first objective lens 42A, with the specimen 43 midway between them, so that the fluorescent light emanating from the specimen 43 is transmitted through the second objective lens 42B and is reflected by the reflecting mirror 45 through the imaging lens 44. Whereby, the light is imaged on the imaging surfaces of the cameras 53A and 53B. Also, the first objective lens 42A is moved vertically along the optical axis so that the beam diameter of light with which the specimen is irradiated can be adjusted.

According to the illumination apparatus for the fluorescence microscope of the fourth embodiment constructed as mentioned above and the image processing apparatus using the illumination apparatus, the excitation light and the fluorescent light follow separate optical paths, and thus it is not necessary that the dichroic mirror 41 of FIG. 4 or the semi-transmissive mirror 46 of FIG. 8 is used to separate the excitation light from the fluorescent light. Consequently, the excitation light and the fluorescent light can be efficiently transmitted, and in particular, when a dark fluorescent specimen is observed, a good effect is brought about. Moreover, since an expensive dual dichroic mirror need not be used, cost can be reduced. The specimen can be excited with light in two different wavelength regions by only the single light source 11, and hence the same effect as in the first embodiment is brought about. In the fourth embodiment also, the illumination section of the microscope can, of course, be constructed as shown in FIG. 5, and in this case, the same effect is obtained.

Fifth Embodiment

Figure 10:
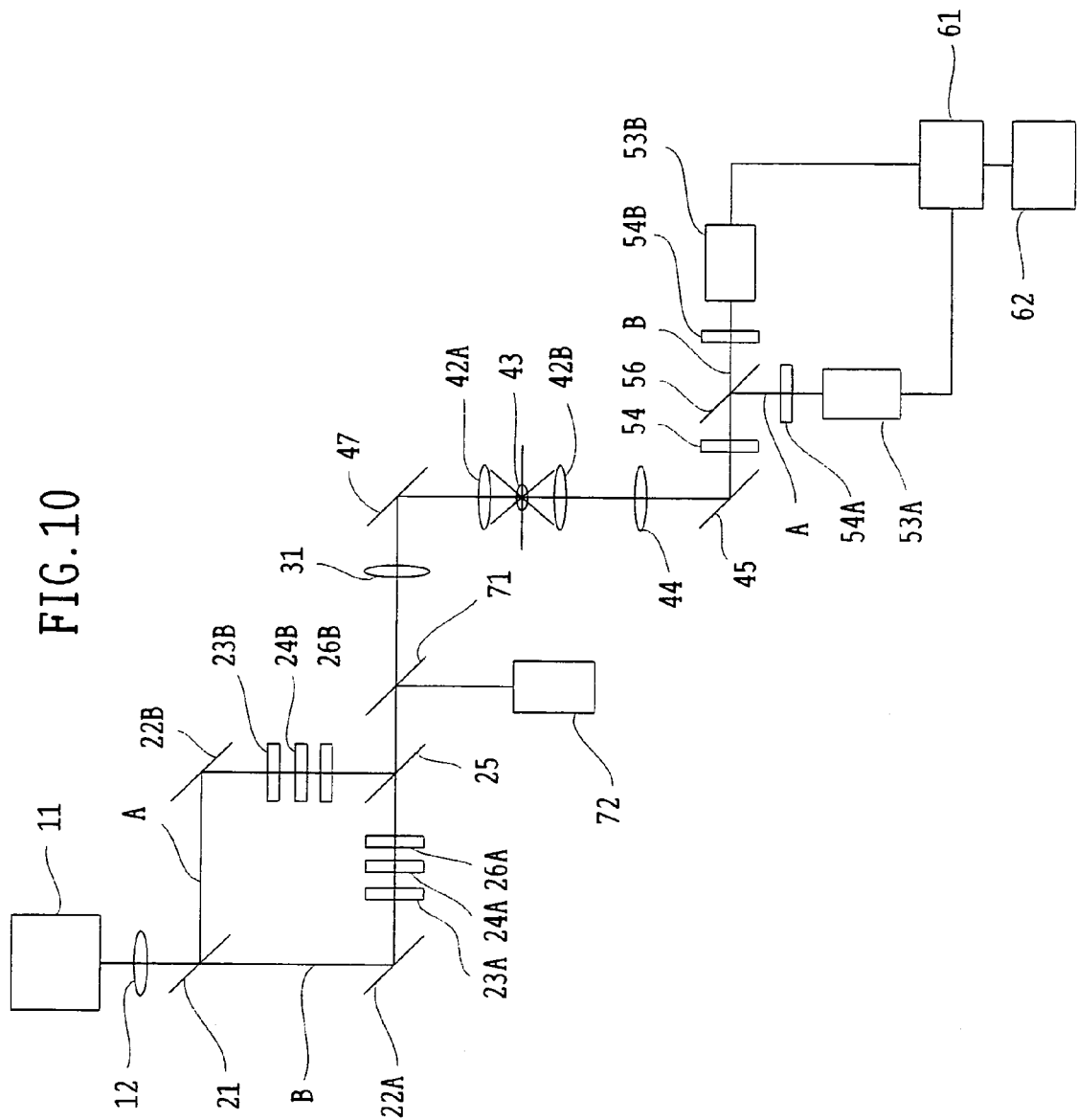
FIG. 10 is a view showing schematically the illumination apparatus for the fluorescence microscope according to a fifth embodiment in the present invention and the image processing apparatus using the illumination apparatus.

FIG. 10 shows the illumination apparatus for the fluorescence microscope according to the fifth embodiment in the present invention and the image processing apparatus using the illumination apparatus. Like numerals are used for like components with respect to the embodiment of FIG. 6, and their detailed explanation is omitted. The fifth embodiment is different from the second embodiment of FIG. 6 in an arrangement on the optical path extending from the semi-transmissive mirror 71 to the reflecting mirror 45. On this optical path, like the fourth embodiment, the projection lens 31, the reflection mirror 47, the first objective lens 42A, the second objective lens 42B, and the imaging lens 44 are arranged.

According to the illumination apparatus for the fluorescence microscope of the fourth embodiment constructed as mentioned above and the image processing apparatus using the illumination apparatus, like the fourth embodiment, the excitation light and the fluorescent light follow separate optical paths, and thus it is not necessary that the dichroic mirror 41 of FIG. 4 or the semi-transmissive mirror is used to separate the excitation light from the fluorescent light. Consequently, the excitation light and the fluorescent light can be efficiently transmitted, and in particular, when a dark fluorescent specimen is observed, a good effect is brought about. Moreover, since an expensive dual dichroic mirror need not be used, cost can be reduced. Other effects are almost the same as in the second embodiment of FIG. 6.

Sixth Embodiment

Figure 11:
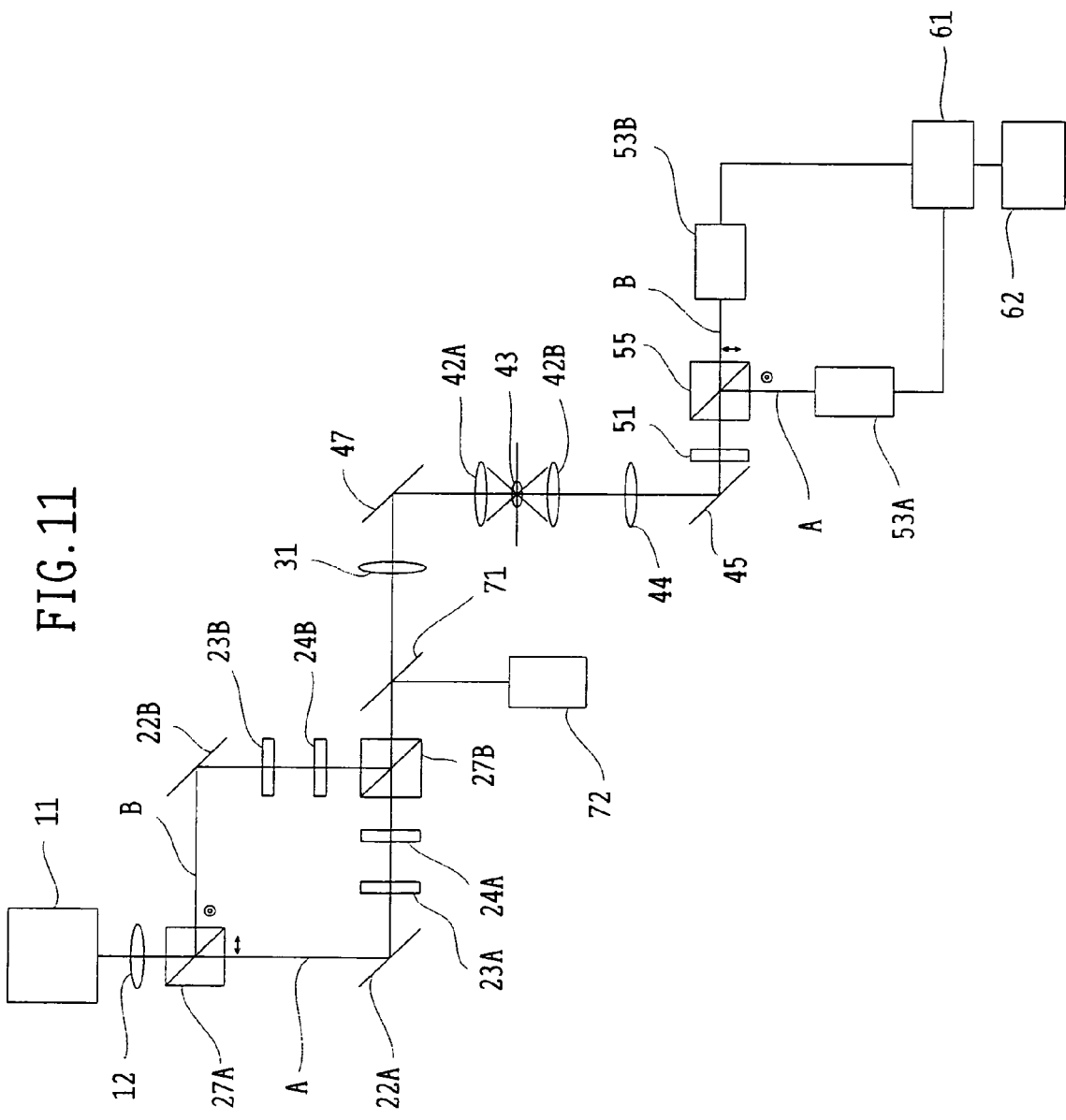
FIG. 11 is a view showing schematically the illumination apparatus for the fluorescence microscope according to a sixth embodiment in the present invention and the image processing apparatus using the illumination apparatus.

FIG. 11 shows the illumination apparatus for the fluorescence microscope according to the sixth embodiment in the present invention and the image processing apparatus using the illumination apparatus. Like numerals are used for like components with respect to the modified example of the second embodiment, shown in FIG. 7, and their detailed explanation is omitted. The sixth embodiment is different from the modified example of the second embodiment, shown in FIG. 7, in an arrangement on the optical path extending from the polarization beam splitter 27B, through the semi-transmissive mirror 71, to the reflecting mirror 45. On this optical path, the projection lens 31, the reflecting mirror 47, the first objective lens 42A, the second objective lens 42B, and the imaging lens 44 are arranged.

According to the illumination apparatus for the fluorescence microscope of the fourth embodiment constructed as mentioned above and the image processing apparatus using the illumination apparatus, like the fourth embodiment, the excitation light and the fluorescent light follow separate optical paths, and thus it is not necessary that the dichroic mirror 41 of FIG. 7 or the semi-transmissive mirror is used to separate the excitation light from the fluorescent light. Consequently, the excitation light and the fluorescent light can be efficiently transmitted, and in particular, when a dark fluorescent specimen is observed, a good effect is brought about. Moreover, since an expensive dual dichroic mirror need not be used, cost can be reduced. Other effects are almost the same as in the modified example of the second embodiment, shown in FIG. 7.

Seventh Embodiment

FIG. 12 shows the illumination apparatus for the fluorescence microscope according to the seventh embodiment in the present invention and the image processing apparatus using the illumination apparatus. Like numerals are used for like components with respect to the embodiment of FIG. 4, and their detailed explanation is omitted. In the seventh embodiment, the light beam emitted form the light source 11 is split into three beams of irradiation light through the semi-transmissive mirror 21 and a semi-transmissive mirror 81, and individual wavelengths of the irradiation light split by these beam splitting means are selected through the excitation filters 24A and 24B and an excitation filter 24C. In addition, a plurality of beams of the irradiation light whose wavelengths are selected are synthesized into a single beam through a semi-transmissive mirror 82 and the semi-transmissive mirror 25.

Light converted into a parallel beam through the collector lens 12 is incident on the semi-transmissive mirror 21 which is the beam splitting means. The semi-transmissive mirror 21 has properties of reflecting a part of the incident beam and transmitting the remainder. On the optical path of the light beam A transmitted through the semi-transmissive mirror 21, the semi-transmissive mirror 81 is places as the beam splitting means. The semi-transmissive mirror 81 has properties of reflecting a part of the incident beam and transmitting the remainder. The reflecting mirror 22A, the attenuation filter 23A, and the excitation filter 24A are arranged on the optical path of the light beam A transmitted through the semi-transmissive mirror 81. The attenuation filter 23C, the excitation filter 24C, and the semi-transmissive mirror 82 are arranged on the optical path of a light beam C reflected by the semi-transmissive mirror 81. On the other hand, the attenuation filter 23B, the excitation filter 24B, and the reflecting mirror 22B are arranged on the optical path of the light beam B reflected by the semi-transmissive mirror 21.

The reflecting mirrors 22A and 22B and the semi-transmissive mirrors 81 and 82 are provided with tilt adjusting mechanisms (not shown) for completely equalizing the traveling directions and the positions on the optical paths after the light beams A, B, and C travel through the semi-transmissive mirror 25.

The attenuation filters 23A, 23B, and 23C are designed so that the amounts of light of the light beams A, B, and C, respectively, can be independently adjusted. The attenuation filters 23 A, 23B, and 23C are provided to be easily movable in and out of the optical paths of the light beams A, B, and C, respectively, through turrets or sliders.

The excitation filters 24A, 24B, and 24C have properties of transmitting only light in particular wavelength regions of the light beams A, B, and C, respectively, and are provided to be easily movable in and out of the optical paths of the light beams A, B, and C, respectively, through turrets or sliders.

The semi-transmissive mirror 82 has properties of transmitting part of incident light and reflecting part thereof, and is constructed so that the parallel beam B transmitted through the semi-transmissive mirror 82 and the parallel beam C reflected by the semi-transmissive mirror 82 are synthesized to be incident on the semi-transmissive mirror 25. The semi-transmissive mirror 25 has properties of transmitting part of the incident light and reflecting part thereof, and is constructed so that the parallel beam A transmitted through the semi-transmissive mirror 25 and the parallel beams B and C reflected by the semi-transmissive mirror 25 are synthesized. In this case, the tilt adjustments of the reflecting mirrors 22A and 22B and the semi-transmissive mirrors 81 and 82 are made through their tilt adjusting mechanisms mentioned above, and thereby the traveling directions and the positions on the optical paths of the parallel beams A, B, and C traveling through the semi-transmissive mirror 25 are in complete agreement.

In the seventh embodiment, a multichroic mirror which has the reflection characteristic of at least three reflection peaks is used for the dichroic mirror 41. The excitation filters 24A, 24B, and 24C are selected in accordance with the reflection peaks of the dichroic mirror 41. In the seventh embodiment, a three-imager-type color CCD camera in which the fluorescent light from the specimen 43 is divided into three wavelength components for imaging is used as a camera 91, and the optical members corresponding to the dichroic mirror 51 and the fluorescence filters 52A and 52B, shown in the embodiment of FIG. 4, are eliminated.

According to the illumination apparatus for the fluorescence microscope in the seventh embodiment constructed as mentioned above and the image processing apparatus using the illumination apparatus, the specimen can be excited with light in three different wavelength regions by only the single light source 11, and hence the same effect as in the first embodiment is secured. Furthermore, the specimen is excited with light in at least three wavelength regions at the same time and at least three kinds of fluorescent light can be observed at the same time, thus bringing about the effect that, for example, changes of calcium ion concentration and chloride ion concentration can be observed simultaneously.

Also, although in the seventh embodiment the example where the illumination beam is divided into three components is cited, it is possible to divide the beam into four or more components. When the semi-transmissive mirror is used instead of the dichroic mirror 41, the same effect as in the third embodiment is obtained.

Also, although in FIG. 12 the three-imager-type color CCD camera in which the fluorescent light from the specimen 43 is divided into three wavelength components for imaging is used as the camera 91, the dichroic mirror 51 shown in FIG. 4 may be used to divide the optical path of the light into three so that a fluorescence filter and a single-imager-type CCD camera are placed on each optical path.

FIG. 13 shows a modified example of the seventh embodiment. Like numerals are used for like components with respect to the embodiment of FIG. 12, and their detailed explanation is omitted. In this modified example, the dichroic mirror 51 is placed on the optical path of the reflection side of the reflecting mirror 45 to divide the light beam reflected by the reflecting mirror 45 into the light beam B' and another light beam. A dichroic mirror 51' is placed on the optical path of the light beam reflected by the dichroic mirror 51 to divide the light beam reflected by the dichroic mirror 51 into the light beam A' and a light beam C'. On the optical paths of the individual divided light beams A', B' and C', the fluorescence filters 52A and 52B and a fluorescence filter 52C, transmitting only light in the particular wavelength regions, and the cameras 53A and 53B and a camera 53C are provided. For each of the cameras 53A, 53B, and 53C, the single-imager-type CCD camera is used.

When the illumination apparatus is constructed like the modified example, the manufacturing cost of the entire apparatus can be reduced because the single-imager-type CCD camera is more inexpensive than in the case where the three-imager-type color CCD camera of FIG. 12 is used. The fluorescence filter is placed on each of the optical paths of the three-divided light beams A', B', and C', and thus even when the fluorescent substance in the specimen is changed, the fluorescence filter provided with the property corresponding to the fluorescent light is provided to be movable in and out of each of the optical paths of the light beams A', B', and C', and fluorescence photography can be performed without replacing the CCD camera like the case where the three-imager-type color CCD camera is used. Other effects are the same as in the embodiment of FIG. 12.

The seventh embodiment in FIGS. 12 and 13 is also applicable to the apparatus constructed, as shown in the embodiment of FIG. 9, to have the projection lens 31, the reflecting mirror 47, the first objective lens 42A, the second objective lens 42B, and the imaging lens 44, with respect to the optical path extending from the semi-transmissive mirrors 25 and 71 to the reflecting mirror 45.

The invention claimed is:

1. An image processing apparatus for a microscope, comprising:
   a light source for white light;
   a beam splitting member for splitting a light beam emitted from the light source into a beam of first irradiation light and a beam of second irradiation light;
   a first attenuation filter for adjusting an intensity of the first irradiation light;
   a second attenuation filter for adjusting an intensity of the second irradiation light;
   a first excitation filter for selecting a wavelength of the first irradiation light;
   a second excitation filter for selecting a wavelength of the second irradiation light;
   a beam synthesizing member for synthesizing the beam of the first irradiation light whose wavelength is selected and the beam of the second irradiation light whose wavelength is selected, into a single light beam;
   a semi-transmissive mirror for introducing the single light beam as synthesized by the beam synthesizing member in a direction of a specimen;
   an objective lens interposed between the semi-transmissive mirror and the specimen;
   a dichroic mirror, arranged to receive fluorescent light which has been emitted from the specimen and passed through the objective lens and the semi-transmissive mirror, for splitting the fluorescent light emitted from the specimen into a beam of first fluorescent light generated by excitation with the first irradiation light whose wavelength is selected by the first excitation filter and a beam of second fluorescent light generated by excitation with the second irradiation light whose wavelength is selected by the second excitation filter;
   a first camera for imaging the first fluorescent light;
   a second camera for imaging the second fluorescent light;
   a first fluorescence filter arranged between the dichroic mirror and the first camera, to be used in combination with the first excitation filter;
   a second fluorescence filter arranged between the dichroic mirror and the second camera, to be used in combination with the second excitation filter; and
   an image processor for performing synthesis processing of fluorescent images respectively imaged by the first camera and the second camera;
   wherein at least one of the first attenuation filter, the second attenuation filter, and the image processor is used for image adjustment so that an intensity of the first fluorescent light and an intensity of the second fluorescent light in an ultimate synthesized image are at an equal level.

2. An image processing apparatus for a microscope, comprising:
   a light source for white light;

a beam splitting member for splitting a light beam emitted from the light source into a beam of first irradiation light and a beam of second irradiation light;

a first attenuation filter for adjusting an intensity of the first irradiation light;

a second attenuation filter for adjusting an intensity of the second irradiation light;

a first excitation filter for selecting a wavelength of the first irradiation light;

a second excitation filter for selecting a wavelength of the second irradiation light;

a beam synthesizing member for synthesizing the beam of the first irradiation light whose wavelength is selected and the beam of the second irradiation light whose wavelength is selected, into a single light beam, and for introducing the single light beam as synthesized in a direction of a specimen;

an objective lens for illumination arranged between the beam synthesizing member and the sample;

an objective lens for observation used for observation of the sample;

a dichroic mirror, arranged to receive fluorescent light which has been emitted from the specimen and passed through the objective lens for observation, for splitting the fluorescent light emitted from the specimen into a beam of first fluorescent light generated by excitation with the first irradiation light whose wavelength is selected by the first excitation filter and a beam of second fluorescent light generated by excitation with the second irradiation light whose wavelength is selected by the second excitation filter;

a first camera for imaging the first fluorescent light;

a second camera for imaging the second fluorescent light;

a first fluorescence filter arranged between the dichroic mirror and the first camera, to be used in combination with the first excitation filter;

a second fluorescence filter arranged between the dichroic mirror and the second camera, to be used in combination with the second excitation filter; and an image processor for performing synthesis processing of fluorescent images respectively imaged by the first camera and the second camera;

wherein at least one of the first attenuation filter, the second attenuation filter, and the image processor is used for image adjustment so that an intensity of the first fluorescent light and an intensity of the second fluorescent light in an ultimate synthesized image are at an equal level.

3. An image processing apparatus for a microscope, comprising:

a light source for white light;

a beam splitting member for splitting a light beam emitted from the light source into a beam of first irradiation light and a beam of second irradiation light;

a first attenuation filter for adjusting an intensity of the first irradiation light;

a second attenuation filter for adjusting an intensity of the second irradiation light;

a first excitation filter for selecting a wavelength of the first irradiation light;

a second excitation filter for selecting a wavelength of the second irradiation light;

a first polarization filter for selecting a polarization direction of the first irradiation light;

a second polarization filter for selecting a polarization direction of the second irradiation light;

a beam synthesizing member for synthesizing the beam of the first irradiation light whose wavelength is selected and the beam of the second irradiation light whose wavelength is selected, into a single light beam, and for introducing the single light beam as synthesized in a direction of a specimen;

an objective lens used for observation of the sample;

a fluorescence filter, arranged to receive fluorescent light which has been emitted from the specimen and passed through the objective lens;

a semi-transmissive mirror for splitting the fluorescent light, which has been emitted from the specimen and passed through the fluorescence filter, into a beam of first fluorescent light generated by excitation with the first irradiation light which has been selected by the first excitation filter and the first polarization filter and a beam of second fluorescent light generated by excitation with the second irradiation light which has been selected by the second excitation filter and the second polarization filter;

a first camera for imaging the first fluorescent light;

a second camera for imaging the second fluorescent light;

a third polarization filter arranged between the semi-transmissive mirror and the first camera;

a fourth polarization filter arranged between the semi-transmissive mirror and the second camera; and an image processor for performing synthesis processing of fluorescent images respectively imaged by the first camera and the second camera;

wherein the first fluorescent light and the second fluorescent light are adjusted to have predetermined fluorescence intensities by the first attenuation filter and the second attenuation filter, respectively, and, using the image processor, a ratio image is measured upon calculation of a ratio between the two fluorescent images obtained.

4. An image processing apparatus according to claim 3, further comprising a dichroic mirror arranged between the objective lens and the fluorescence filter, for introducing the light beam as synthesized by the beam synthesizing member to the sample via the objective lens.

5. An image processing apparatus according to claim 3, further comprising an objective lens for illumination arranged between the beam synthesizing member and the sample.

6. An image processing apparatus for a microscope, comprising:

a light source for white light;

a first polarization beam splitter for splitting a light beam emitted from the light source into a beam of first irradiation light and a beam of second irradiation light;

a first attenuation filter for adjusting an intensity of the first irradiation light;

a second attenuation filter for adjusting an intensity of the second irradiation light;

a first excitation filter for selecting a wavelength of the first irradiation light;

a second excitation filter for selecting a wavelength of the second irradiation light;

a first polarization filter for selecting a polarization direction of the first irradiation light;

a second polarization filter for selecting a polarization direction of the second irradiation light;

a second polarization beam splitter for synthesizing the beam of the first irradiation light whose wavelength is selected and the beam of the second irradiation light whose wavelength is selected, into a single light beam, and for introducing the single light beam as synthesized in a direction of a specimen;

an objective lens used for observation of the sample;

a fluorescence filter, arranged to receive fluorescent light which has been emitted from the specimen and passed through the objective lens;

a third polarization beam splitter for splitting a beam of the fluorescent light which has been emitted from the specimen and passed through the fluorescence filter into a beam of first fluorescent light generated by excitation with the first irradiation light which has been selected by the first excitation filter, the first polarization beam splitter and the second polarization beam splitter and a beam of second fluorescent light generated by excitation with the second irradiation light which has been selected by the second excitation filter, the first polarization beam splitter and the second polarization beam filter;

a first camera for imaging the first fluorescent light;

a second camera for imaging the second fluorescent light; and an image processor for performing synthesis processing of fluorescent images respectively imaged by the first camera and the second camera;

wherein the first fluorescent light and the second fluorescent light are adjusted to have predetermined fluorescence intensities by the first attenuation filter and the second attenuation filter, respectively, and, using the image processor, a ratio image is measured upon calculation of a ratio between the two fluorescent images obtained.

7. An image processing apparatus according to claim 6, further comprising a dichroic mirror arranged between the objective lens and the fluorescence filter, for introducing the light beam as synthesized by the second polarization beam splitter to the sample via the objective lens.

8. An image processing apparatus according to claim 6, further comprising an objective lens for illumination arranged between the second polarization beam splitter and the sample.

9. An image processing apparatus for a microscope, comprising:

a light source for white light;

a first beam splitting member for splitting a light beam emitted from the light source into a beam of first irradiation light and a beam of second irradiation light;

a first attenuation filter for adjusting an intensity of the first irradiation light;

a second attenuation filter for adjusting an intensity of the second irradiation light;

a first excitation filter for selecting a wavelength of the first irradiation light;

a second excitation filter for selecting a wavelength of the second irradiation light;

a first beam synthesizing member for synthesizing the beam of the first irradiation light whose wavelength is selected and the beam of the second irradiation light whose wavelength is selected, into a single light beam, and for introducing the single light beam as synthesized in a direction of a specimen;

an objective lens used for observation of the sample;

a camera system for imaging a first fluorescent image derived from first fluorescent light emitted from the sample in response to excitation with the first irradiation light whose wavelength is selected by the first excitation filter and a second fluorescent image derived from second fluorescent light emitted from the sample in response to excitation with the second irradiation light whose wavelength is selected by the second excitation filter; and an image processor for performing synthesis processing of the first fluorescent image and the second fluorescent image imaged by the camera system;

wherein at least one of the first attenuation filter, the second attenuation filter, and the image processor is used for image adjustment so that an intensity of the first fluorescent image and an intensity of the second fluorescent image in an ultimate synthesized image are at an equal level.

10. An image processing apparatus according to claim 9, further comprising:

a dichroic mirror arranged between the objective lens and the image processor;

a first fluorescence filter for obtaining the first fluorescent image derived from excitation with the first irradiation light whose wavelength is selected by the first excitation filter; and a second fluorescence filter for obtaining the second fluorescent image derived from excitation with the second irradiation light whose wavelength is selected by the second excitation filter;

wherein the camera system comprises two cameras provided for the first fluorescent image and the second fluorescent image, respectively.

11. An image processing apparatus according to claim 10, wherein each of the first beam splitting member and the first beam synthesizing member is one of a semi-transmissive mirror and a dichroic mirror.

12. An image processing apparatus according to claim 10, further comprising one of a dichroic mirror and a semi-transmissive mirror, arranged between the objective lens and the fluorescent filters, for introducing the single light beam as synthesized by the first beam synthesizing member to the sample via the objective lens.

13. An image processing apparatus according to claim 10, further comprising an objective lens for illumination arranged between the first beam synthesizing member and the sample.

14. An image processing apparatus according to claim 9, further comprising:

a second beam splitting member arranged between the first beam splitting member and the first beam synthesizing member;

a third attenuation filter for adjusting an intensity of third irradiation light;

a third excitation filter for selecting a wavelength of the third irradiation light;

a second beam synthesizing member; and a multi-dichroic mirror having three or more reflection peaks, for introducing the single light beam as synthesized by the first beam synthesizing member to the specimen;

wherein the camera system further images a third fluorescent image derived from third fluorescent light emitted from the sample in response to excitation with the third irradiation light whose wavelength is selected by the third excitation filter.

15. An image processing apparatus according to claim 14, further comprising:
- a dichroic mirror arranged between the objective lens and the image processor;
- a first fluorescence filter for obtaining the first fluorescent image derived from excitation with the first irradiation light whose wavelength is selected by the first excitation filter;
- a second fluorescence filter for obtaining the second fluorescent image derived from excitation with the second irradiation light whose wavelength is selected by the second excitation filter; and
- a third fluorescence filter for obtaining the third fluorescent image derived from excitation with the third irradiation light whose wavelength is selected by the third excitation filter;

wherein the camera system comprises three cameras provided for the first fluorescent image, the second fluorescent image and the third fluorescent image, respectively.

* * * * *